United States Patent
Erna

(10) Patent No.: US 10,869,000 B2
(45) Date of Patent: Dec. 15, 2020

(54) SYSTEM AND METHOD FOR PROVIDING WIDE-AREA IMAGING AND COMMUNICATIONS CAPABILITY TO A HANDHELD DEVICE

(71) Applicant: Salvatore Erna, Windham, NH (US)

(72) Inventor: Salvatore Erna, Windham, NH (US)

(*) Notice: Subject to any disclaimer, the term of this patent is extended or adjusted under 35 U.S.C. 154(b) by 0 days.

(21) Appl. No.: 16/784,490

(22) Filed: Feb. 7, 2020

(65) Prior Publication Data

US 2020/0260049 A1 Aug. 13, 2020

Related U.S. Application Data

(60) Provisional application No. 62/802,675, filed on Feb. 7, 2019.

(51) Int. Cl.
| | |
|---|---|
| H04N 7/14 | (2006.01) |
| H04N 5/247 | (2006.01) |
| H04N 5/225 | (2006.01) |
| H04N 5/232 | (2006.01) |
| H04N 7/08 | (2006.01) |

(Continued)

(52) U.S. Cl.
CPC ......... *H04N 7/142* (2013.01); *H04M 1/0264* (2013.01); *H04N 5/2257* (2013.01); *H04N 5/23229* (2013.01); *H04N 5/23238* (2013.01); *H04N 5/247* (2013.01); *H04N 7/0806* (2013.01); *H04N 7/147* (2013.01); *H04N 7/15* (2013.01); *H04N 21/4316* (2013.01); *H04N 21/47* (2013.01); *H04N 2007/145* (2013.01)

(58) Field of Classification Search
USPC .. 348/14.01, 14.02, 14.07, 14.08, 14.16, 47, 348/48, 50
See application file for complete search history.

(56) References Cited

U.S. PATENT DOCUMENTS

| | | | |
|---|---|---|---|
| 10,320,962 B1 * | 6/2019 | Chang | ..................... G06F 3/147 |
| 2012/0081503 A1 | 4/2012 | Leow | |

(Continued)

OTHER PUBLICATIONS

Screen capture from "zte devices" webpage, ZTE Axon m, retrieved at least Dec. 6, 2018, retrieved from the internet <URL: https://www.ztedevices.com/en/product/smart-phone/axonm>.

(Continued)

*Primary Examiner* — Yosef K Laekemariam
(74) *Attorney, Agent, or Firm* — Loginov & Associates, PLLC; William A. Loginov

(57) ABSTRACT

This invention provides a system and method for utilizing a wireless, handheld communication device to image a scene in multiple directions, so as to include multiple parties in addition to the user, and also, optionally, to project images on a plurality of display screens—for example a user-facing screen on the front face of the phone and an opposing screen on the rear/back face of the phone that faces (e.g.) a chat participant other than the user (an audience). The housing of the smartphone is adapted to provide a multi-camera and multi-screen arrangement. More particularly, the housing of the smartphone is adapted to include (at least) a front-directed camera and a rear-directed camera on respective front and rear faces, and openings along the left and right side edges for small-scale cameras and associated protective windows that are directed to image the left and right areas adjacent to the phone.

20 Claims, 26 Drawing Sheets

Fig. 1

(51) Int. Cl.
  *H04N 7/15* (2006.01)
  *H04M 1/02* (2006.01)
  *H04N 21/47* (2011.01)
  *H04N 21/431* (2011.01)

(56) References Cited

U.S. PATENT DOCUMENTS

| | | | |
|---|---|---|---|
| 2012/0274736 A1* | 11/2012 | Robinson | H04N 7/15 |
| | | | 348/14.16 |
| 2014/0072270 A1 | 3/2014 | Goldberg | |
| 2015/0085184 A1 | 3/2015 | Vidal | |
| 2015/0094118 A1* | 4/2015 | Rodolico | H04M 1/0264 |
| | | | 455/566 |
| 2015/0324002 A1 | 11/2015 | Quiet | |
| 2016/0088132 A1* | 3/2016 | Kranz | H02J 7/00 |
| | | | 340/573.1 |
| 2017/0357473 A1 | 12/2017 | Kim | |
| 2018/0278916 A1 | 9/2018 | Kim | |

OTHER PUBLICATIONS

Screen capture from "OWLLabs Meeting Owl" webpage, OWLLabs, retrieved at least Dec. 6, 2018, retrieved from the internet <URL: https://www.owllabs.com/>.

Screen capture from "Insta360 nano s" webpage, insta360, retrieved at least Dec. 6, 2018, retrieved from the internet <URL: https://www.insta360.com/product/insta360-nanost>.

* cited by examiner

SYSTEM AND METHOD FOR PROVIDING WIDE-AREA IMAGING AND COMMUNICATIONS CAPABILITY TO A HANDHELD DEVICE

RELATED APPLICATIONS

This application claims the benefit of U.S. Provisional Application Ser. No. 62/802,675, filed Feb. 7, 2019, entitled SYSTEM AND METHOD FOR PROVIDING WIDE-AREA IMAGING AND COMMUNICATIONS CAPABILITY TO A HANDHELD DEVICE, the entire disclosure of which is herein incorporated by reference.

FIELD OF THE INVENTION

This invention relates to handheld devices for communication, and imaging and more particularly to smartphones that employ video chat applications.

BACKGROUND OF THE INVENTION

Cellular telephones have become a near necessity in modern life. The most recent versions of such telephones are generally referred to a "smartphones" as they incorporate substantial processing and data storage capability. This computing capability is accessed and controlled via a graphical user interface (GUI) in the form of a touchscreen that takes up the majority of space along one side of the smartphone. Additional buttons, phono/data/charging ports, speakers, etc. are also placed strategically along the front, rear or relatively thin sides of the smartphone. Batteries are typically embedded in the smartphone casing in a manner that often renders this component inaccessible to the user. As such, the rear (or back) of the smartphone is increasingly unused, blank space, while the front carries a relatively large touchscreen that attempts to maximize the available area. The layout of buttons, etc. is designed to allow a user to hold the phone either to use as a camera, capturing still or moving images (and audio) of a scene, or to hold the phone at arm's length to employ video and speakerphone functions. In such a mode, the user speaks into the phone while an application directs its front camera to image the user. The screen projects an app GUI and/or other video content, as described below. The phone's general layout also facilitates use as a conventional phone, held close to the ear with the microphone directed toward the user's mouth. Some users also opt to employ peripheral devices, such as Bluetooth® enabled speakers and/or earpieces, as well as car-based audio systems.

It should be clear that the smartphone affords a highly versatile platform for an enormous range of audiovisual activities. As described above, a highly popular use is with a video chat application (also termed herein "app") in which at least two participants use their phones to stream live video and audio of each other. One highly popular chat app is FaceTime®, available from Apple Corporation of Cupertino, Calif., which is typically used on the Apple iPhone® smartphone platform. Other video chat apps for use on similar smartphone platforms (e.g. Samsung Android®, LG, etc.), include, but are not limited to, Skype® by Microsoft Corporation of Redmond, Wash., Facebook® Messenger, Google Duo®, etc.

In general, such apps employ a single camera (or cluster of cameras imaging the same overall area) and a single display screen that is directed at one subject—typically the user of the smartphone. This limits the versatility of the smartphone and app in an increasingly wired culture where many individuals may wish to participate in the same chat session.

SUMMARY OF THE INVENTION

This invention overcomes disadvantages of the prior art by providing a system and method for utilizing a wireless, handheld communication device to image a scene in multiple directions, so as to include multiple parties in addition to the user, and also, optionally, to project images on a plurality of display screens—for example a user-facing screen on the front face of the phone and an opposing screen on the rear/back face of the phone that faces (e.g.) a chat participant other than the primary user (an audience). This arrangement affords a more immersive (e.g.) video chat experience that includes multiple parties at multiple locations around a room or other venue. The housing of the smartphone is adapted to provide a multi-camera and multi-screen arrangement, and more particularly, to include (at least) a front-directed camera and a rear-directed camera on respective front and rear faces. The housing also includes openings along (at least) the left and right side edges for small-scale cameras and associated protective windows that are directed to image the left and right areas adjacent to the phone. In this manner, the phone can acquire images of an entire, or nearly entire, 360-degree area around the user. The cameras are each located at positions along the housing that avoids inconvenient finger placement while holding the smartphone, and allows each camera to enjoy an unobstructed view of the scene. A smartphone cover can be provided to the housing with appropriate openings and/or light-transmitting/touch-sensitive windows to enable the cameras to image the scene and the display(s) to project images to the user and any participants/audience.

In an illustrative embodiment, a smartphone can include a housing having a front face, a rear face, a left side edge and a right side edge, the left side edge and the right side edge separating the front face and the rear face; a frond display screen on the front face, at least one front camera on the front face, at least one rear camera on the rear face, at least one left camera on the left side edge, at least one right camera on the right side edge, and a processor in the housing that arranges image data streams from each of the front camera, the rear camera, the left camera and the right camera for storage or data transmission to a recipient device over a wireless network. A smartphone can have a rear display on the rear face. The processor can operate at least one of a video imaging application and a video chat application that can coordinate acquisition of subject images by the front camera, the rear camera, the left camera, and the right camera, and that displays images of one or more subjects from the recipient device on at least one of the front display screen and the rear display screen. The front display screen or the rear display screen can display subject images in respective split screen arrangements. The front display screen or the rear display screen can display subject images in a combined panoramic arrangement. The smartphone can include at least one camera on the top edge, and at least one camera on the bottom edge. The smartphone can include two or more microphones on different edges and/or faces of the smartphone for use in triangulating the source of a sound. The at least one side camera can be mounted within a notch on the side of the phone. The notch can have a notch depth of up to 5 mm. The notch can be covered with a clear covering, so that the side of the smartphone has a smooth, unbroken appearance at the notch. The clear covering can be a prismatic lens that allows the camera to image more than 180 degrees around the phone. At least one side camera can be under a covering that bulges out from the side of the smartphone. The covering can bulge out from the smartphone up to 5 mm. The covering can be a prismatic lens that allows the camera to image more than 180 degrees around the phone.

In an illustrative embodiment, a method of participating in a video chat can include positioning multiple participants around a user's smartphone, the smart phone having a front camera, a rear camera, a left side camera, and a right side camera, the participants positioned so that different participants can be imaged by different cameras, at least one of the cameras being a left side camera or a right side camera, capturing video of the multiple participants using the different cameras; transmitting the video taken from multiple cameras and showing the multiple participants to a remote device, receiving video from the remote device at the user's smartphone; and displaying the video received from the remote device on the user's smartphone, the user's smartphone having a screen on the front of the smartphone and a screen on the back of the smartphone, wherein displaying the video includes displaying the same video on the front screen and on the back screen. The method can include triangulating the source of a sound, using multiple microphones, to identify which participant is speaking. The method can include displaying the speaking participant larger than other participants. Displaying the video can include displaying video of multiple participants collected from multiple cameras at the remote participant's smartphone. The method can include combining the videos of multiple participants in to a single panoramic view. The method can include presenting up to four remote participant videos in up to four tiles on the front screen and on the back screen, with up to four videos of users at the user's phone shown in smaller tiles.

BRIEF DESCRIPTION OF THE DRAWINGS

The invention description below refers to the accompanying drawings, of which.

DETAILED DESCRIPTION

Figure 1:
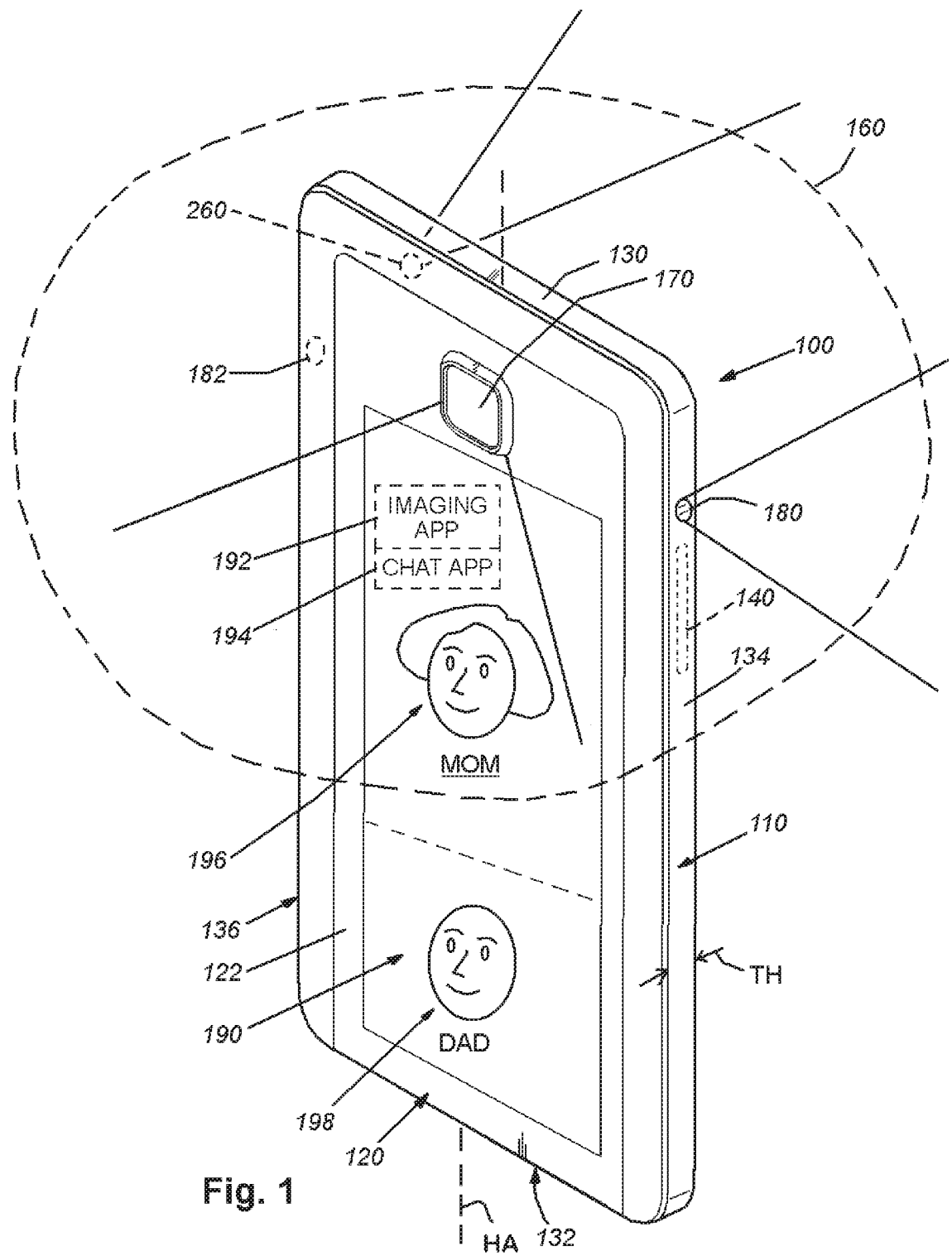
FIG. 1 is a rear perspective view of a multi-camera, multi-screen smartphone and associated video chat application, according to an exemplary embodiment.
Figure 2:
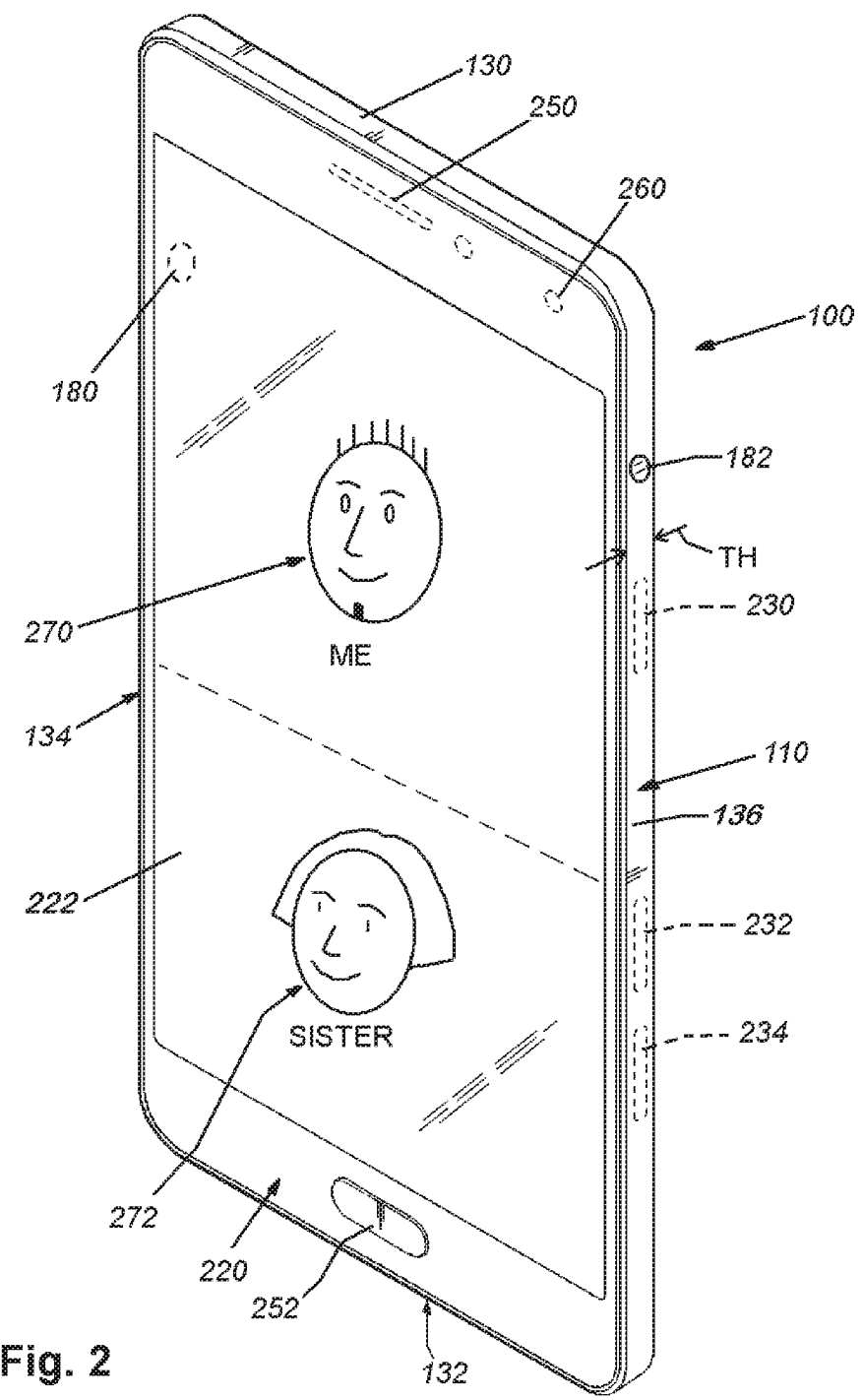
FIG. 2 is a front perspective view of the multi-camera, multi-screen smartphone of FIG. 1.

Reference is made to FIGS. 1 and 2, which depict a smartphone 100 according to an exemplary embodiment. The smartphone 100 in this exemplary embodiment can be based upon an existing commercially available model from (e.g.) Apple, Samsung, LG, etc., or an updated design from any acceptable manufacturer. In general, the smartphone includes a housing 110 that is either sealed against the environment or porous, as appropriate. The housing 110 includes a rear face 120 (FIG. 1) and opposing front face 220 (FIG. 2). Each face can be (e.g.) 2-3 inches wide and 4-6 inches tall in a conventional implementation. The housing 110 has a peripheral side edge along its top (130), bottom (132), left (134) and right (136) sides, which defines a thickness TH of between approximately ⅛ inch and ½ inch in various examples. However, this measurement is highly variable, and can be more or less that the stated range. More generally, the housing face size and/or thickness can vary widely for differing makes/models of smartphone contemplated herein.

The side edges 130, 132, 134, 136 can include various interface components—for example function buttons 140, 230, 232, 234, charging/data ports, audio in/out and speakers (not shown—along bottom edge 132). These components can vary widely across different smartphone platforms and can be omitted in certain examples—where wireless data/charging is used and the housing is meant to be sealed against the environment. At least one, and possibly several, microphones 250 (FIG. 2) are provided for audio input on the front face 220. A main interface (home) button 252 can also be provided along the front face 220 in various examples.

Notably, the depicted smartphone 100 includes a plurality of cameras, located in a manner that produces coverage of an approximately 360-degree circle 160 about the longitudinal (long) axis HA of the housing 110 (See FIG. 1). As such a rear camera 170 is located on the rear face 120. This camera 170 can also serve as a primary high-resolution photography camera. A front camera 260, which can also serve as a so-called selfie camera, is located on the opposing front face 220 (FIG. 2). Moreover, side cameras 180 and 182 are located one each on opposing left and right side edges 134 and 136, respectively. These side cameras 180, 182 can be located at any point along the housing side edge. In this example, they are placed near to (e.g. within ½ and 1½ inches of the top edge 130 to avoid interference with the grasping fingers of a user. Other placements are expressly contemplated. The side cameras 180, 182 can be constructed using conventional technology—for example small-scale board cameras of sufficient resolution. The lens for each camera can be sealed into a port on the side edge, or a separate sealed transparent cover can overlie an embedded camera lens. The side cameras can have fixed focus, mechanical autofocus (using e.g. a variable mechanical lens or liquid lens), or can rely on electronic focus. Each side camera can include an appropriate two-dimensional (2D) image sensor of appropriate pixel resolution or another mechanism for translating a scanned image of a 1D pixel array into a 2D image. The construction of the camera assembly is described further below.

The housing provides a front display screen 222 located along all or a portion of the front housing face 220, as is known in smartphone technology (FIG. 2). The housing also provides an optional rear display screen 190 located along all or a portion of the rear housing face 120 (FIG. 1). The rear screen 190 can be embedded behind a transparent window or provided flush with the face 120. Likewise, the screen can include conventional touchscreen functionality along all or a portion of its surface area, or can be a display-only screen. The screen 190 typically employs a color LCD matrix to provide images. The screen 190 and underlying rear face 120 can be constructed so as to be removable by (e.g.) a technician for servicing or replacement of components. The removability can be accomplished in a variety of ways that should be clear to those of skill. For example, a sealed seam around the screen perimeter can allow the rear face 120 to be separated from the rest of the housing 110. The rear screen 190 can be connected to the main circuit board and power supply of the smartphone 100 using a conventional connection arrangement—for example a flexible ribbon cable—in a manner clear to those of skill.

Figure 3:
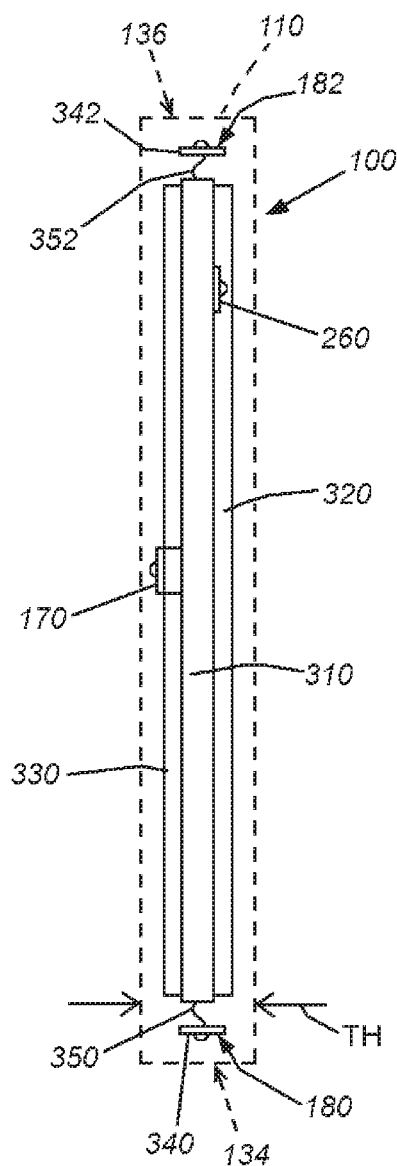
FIG. 3 is a cutaway top view of the multi-camera, multi-screen smartphone of FIG. 1, showing placement of the primary circuit board, cameras and screen with respect to the smartphone housing.

With reference to FIG. 3, the generalized construction of the smartphone 100 is shown in further detail. FIG. 3 is a cutaway top view of the multi-camera, multi-screen smartphone of FIG. 1, showing placement of the primary circuit board, cameras and screen with respect to the smartphone housing. The housing 110 is shown in phantom for further clarity. The main circuit board 310 is shown residing in the approximate center of the housing thickness TH, although actual placement in the housing is highly variable. Additionally, the main circuit board 310 can be substituted for one or more sub-assembly circuit boards as appropriate. As shown, the front touchscreen LCD matrix 320 is placed in a conventional location overlying the main circuit board, and is connected to it in a conventional manner. The front camera 260, rear camera 170, and side cameras 180 and 182 can all be connected directly or indirectly to the main circuit board 310. The front and rear cameras 260 and 170 are shown connected directly to the main circuit board 310. The side camera units 180, 182 are shown positioned with respect to each side edge 134, 136 of the housing 110. In this example, the units 180 and 182 are provided on small rigid or flexible circuit boards 340 and 342 (respectively). The boards 340 and 342 are part of, or connected to, appropriate ribbon cables 350 and 352, respectively. These cables 350 and 352 are connected to the main circuit board 310 and/or a subassembly circuit board. While not shown, a rechargeable battery is provided within the housing and interconnected to the circuit board and any appropriate power-handling circuitry. The rear display screen LCD matrix 330 is also shown connected to and/or overlying the main circuit board 310.

The cameras 170, 180, 182 and 260 are all interfaced with one or more appropriate video processor(s), which can be instantiated on separate chip(s) or as part of the overall smartphone processor. This/these video processor(s) can convert the image data acquired by each camera into a data stream so that this data can be further handled for storage, transmission (e.g. streaming) and/or other processes in a manner clear to those of skill. One or more of these handling processes can be controlled by the video imaging and/or video chat application(s) 192, 194 (FIG. 1). The function of this/these applications is now described in further detail.

Figure 4:
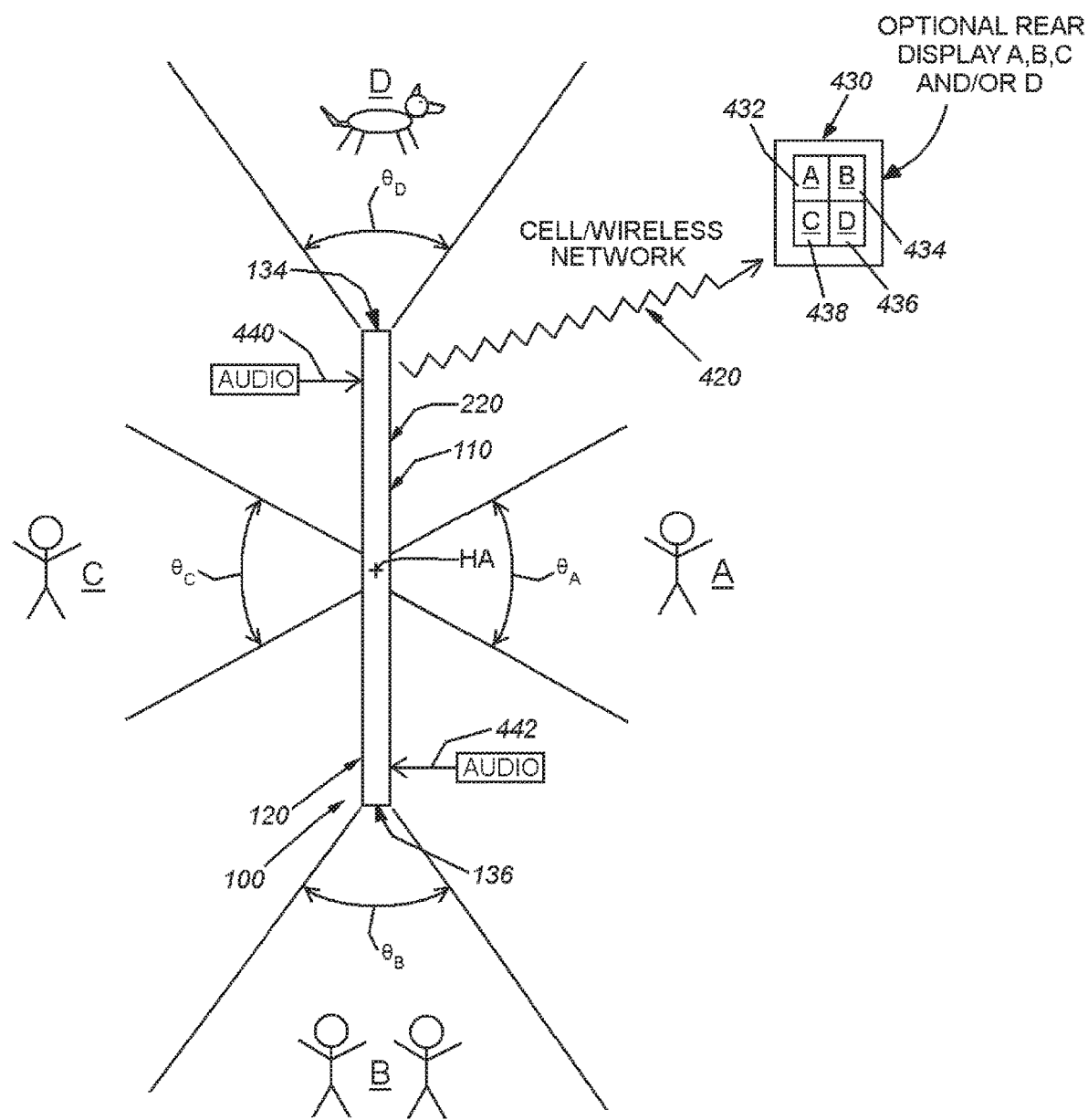
FIG. 4 is a schematic diagram showing the acquisition of multiple still and/or streaming images from respective areas of an approximately 360-degree screen with the multiple cameras of FIG. 1.

With reference to FIGS. 1, 2 and 4, the cameras located along the sides 120, 134, 136 and 220 of the housing 110 include optics that are arranged to provide coverage over a substantial portion, or entirety of, a 360-degree circle 160. As shown, the cameras each define a field of view (in the horizontal plane perpendicular to the phone's longitudinal (long) axis HA), which is represented by associated viewing angles $\theta_A$, $\theta_B$, $\theta_C$ and $\theta_D$. In the example of FIG. 4, each camera of the smartphone 100 includes a portion of a 360-degree scene. The field of view ($\theta_A$-$\theta_D$) of each camera can be fixed, or can vary (using known electronic and physical zoom/focus-adjustment) to focus upon the subject(s) A, B C and D in each field. The image data from each camera is input to the camera processor and handled by the video imaging and chat applications 192, 194 (FIG. 1). These applications allow the streams to be packetized and transmitted over (e.g.) a wireless LAN and/or cellphone network (WAN) 420 to one or more recipient smartphone(s) or other computing device(s) 430. The recipient phone 430 includes a version of the chat application, and can display the subjects A, B, C and D in an associated set of windows 432, 434, 436 and 438. An optional rear display generally in accordance with this description can also be provided on the recipient phone 430. Alternatively, the audio input(s) 440, 442 of the smartphone 100 can triangulate upon the source of any sound from subjects A, B, C and D, and only display on the recipient phone 430 the video stream for that/those subject(s) who are making sufficient noise. The decision to project the image data stream for a given subject can be based upon a decision made by the chat application in the smartphone 100 using conventional techniques that determine the relative direction from which a sound emanates. In one example, this operation entails using a stereo microphone arrangement or multiple microphones (e.g. inputs 440 and 442) placed around the smartphone housing 110. Each microphone receives a greater or lesser volume of a similar sound input, allowing the direction of the sound to be determined. More generally, the recipient can arrange his/her display to decide which subjects to display on his her phone, and how they will be arranged on the window.

The user of the smartphone 100 can also arrange displays of information or video from the recipient or his/her own cameras as shown. For example, FIGS. 1 and 2 each show a split screen with different subjects 196 and 198 (FIG. 1) and 270 and 272 (FIG. 2). The arrangement of subjects and split screens on the front and/or rear display is arbitrary and can be controlled automatically by the chat application, or based on settings entered by the user into the chat application interface. A common setup by the user would entail sending images of people around the recipient's room to split screens on the rear display and (optionally) the front display so that all parties on the user side could view all parties on the recipient side. Likewise, the recipient would project images of all parties on the user side on the rear, and optionally, front screens of the recipient's smartphone. This arrangement creates a fully immersive video chat experience for all parties on both sides.

Note that split screens can be substituted with another form of display imagery—for example, a blended image with various subjects blended together into a single screen. In another implementation the cameras can be used by the user to generate a fully panoramic (e.g. 360-degree) movie. On-board video editing functions can be used to blend the edges of each video stream to create a continuous effect. The 360-degree movie can be viewed using a variety of display modalities that should be clear to those of skill. One possible display function entails linking the imaging and/or video chat applications to the smartphone's built-in accelerometers and allow the image to switch as the smartphone is turned so the that rear screen now faces the user and the front screen faces to audience.

Note that an appropriate case or cover can be constructed using skill in the art to accommodate the additional cameras and rear display screen. Such case or cover can be watertight—using transparent windows where appropriate, or porous, using open ports to allow access for cameras and displays.

Figure 5A:
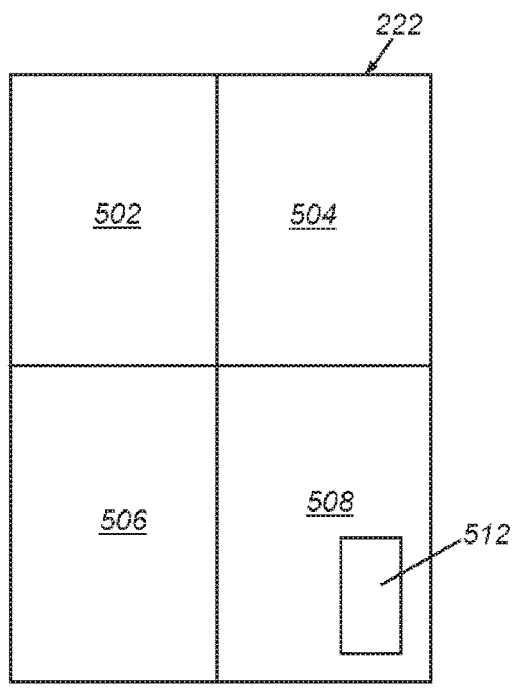
FIG. 5A is a diagrammatic view of a graphical user interface on the front screen of user's multi-camera, multi-screen smartphone showing a chat session with a recipient multi-camera, multi-screen smartphone, according to an illustrative embodiment.

FIGS. 5A-5D show graphical user interfaces on the front and back of a user's phone and a recipient's phone showing a video chat session, according to an illustrative embodiment. FIG. 5A is an exemplary graphical user interface on the front screen of user's multi-camera, multi-screen smartphone. A user's front screen 222 can show images collected from one or more of the cameras on a recipient's phone, and can show a small picture-in-picture image taken from the user's front camera. By way of non-limiting example, image tile 502 can show video recorded by the recipient's front camera, image tile 504 can show video recorded by the recipient's rear camera, image tile 506 can show video recorded by the recipient's left side camera, and image tile 508 can show video recorded by the recipient's right side camera. However, it should be clear that the arrangement and number of tiles can be varied. For example, if only one, two, or three cameras of the recipient's phone are imaging participants, one, two, or three corresponding image tiles can be displayed on the user's front screen 222. An image tile 512 can be presented as a picture-in-picture (PIP) showing the video being collected from the user's front camera and sent to the recipient's phone. A user can optionally rearrange the placement of tiles, if desired, for example, by clicking and dragging any of the tiles 502, 504, 506, 508, or 512 into a different location on the front screen 222. A user can optionally turn on or off cameras on the user's phone, or tiles on the user's screen to highlight selected participants.

Figure 5B:
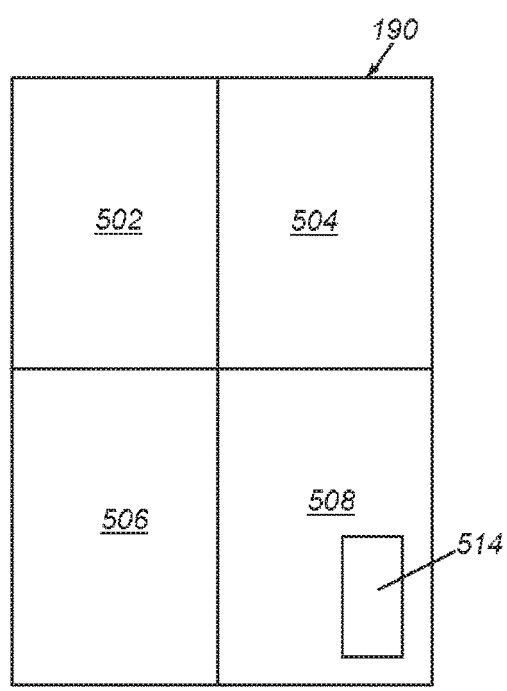
FIG. 5B is a diagrammatic view of a graphical user interface on the rear screen of the user's multi-camera, multi-screen smartphone showing a chat session with a recipient multi-camera, multi-screen smartphone, according to an illustrative embodiment.

FIG. 5B is a graphical user interface on the rear screen of the user's multi-camera, multi-screen smartphone showing a chat session with a recipient multi-camera, multi-screen smartphone, according to an illustrative embodiment. A user's rear screen 190 can show images collected from one or more of the cameras on a recipient's phone, and can show a small picture-in-picture image taken from the user's rear camera. By way of non-limiting example, image tile 502 can show video recorded by the recipient's front camera, image tile 504 can show video recorded by the recipient's rear camera, image tile 506 can show video recorded by the recipient's left side camera, and image tile 508 can show video recorded by the recipient's right side camera. However, it should be clear that the arrangement and number of tiles can be varied. For example, if only one, two, or three cameras of the recipient's phone are imaging participants, one, two, or three corresponding image tiles can be displayed on the user's rear screen 190. An image tile 514 can be presented as a PIP showing the video being collected from the user's rear camera and sent to the recipient's phone. A user can optionally rearrange the placement of tiles, if desired, for example, by clicking and dragging any of the tiles 502, 504, 506, 508, or 514 into a different location on the rear screen 190.

Figure 5C:
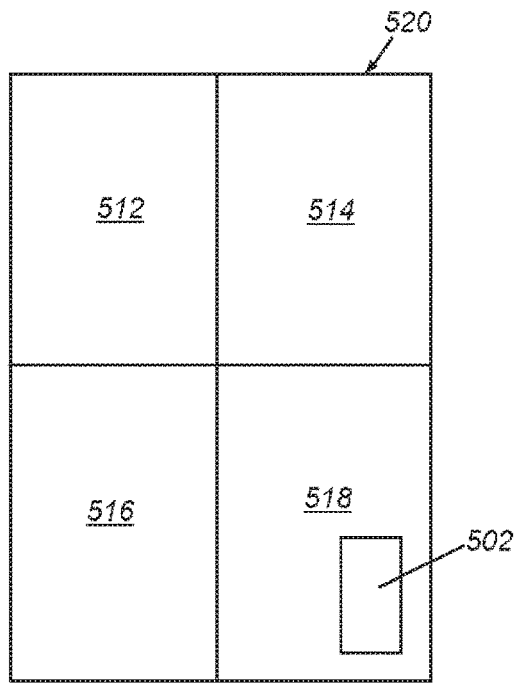
FIG. 5C is a diagrammatic view of a graphical user interface on the front screen of a recipient's multi-camera, multi-screen smartphone showing a chat session with the user's multi-camera, multi-screen smartphone, according to an illustrative embodiment.

FIG. 5C is a graphical user interface on the front screen of a recipient's multi-camera, multi-screen smartphone showing a chat session with the user's multi-camera, multi-screen smartphone, according to an illustrative embodiment. A recipient's front screen 520 can show images collected from one or more of the cameras on a user's phone, and can show a small picture-in-picture image taken from the recipient's front camera. By way of non-limiting example, image tile 512 can show video recorded by the user's front camera, image tile 514 can show video recorded by the user's rear camera, image tile 516 can show video recorded by the user's left side camera, and image tile 518 can show video recorded by the user's right side camera. However, it should be clear that the arrangement and number of tiles can be varied. For example, if only one, two, or three cameras of the user's phone are imaging participants, one, two, or three corresponding image tiles can be displayed on the recipient's front screen 520. An image tile 502 can be presented as a PIP showing the video being collected from the recipient's front camera and sent to the user's phone. A recipient can optionally rearrange the placement of tiles, if desired, for example, by clicking and dragging any of the tiles 512, 514, 516, 518, or 502 into a different location on the front screen 520. A recipient can optionally turn on or off cameras on the recipient's phone, or tiles on the recipient's screen to highlight selected participants.

Figure 5D:
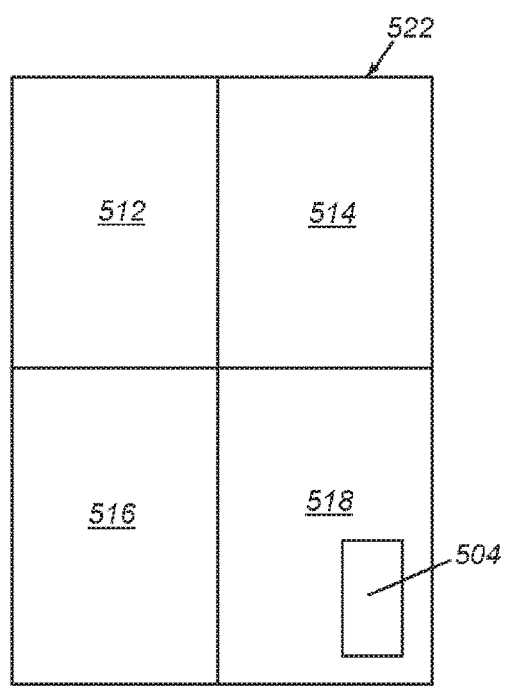
FIG. 5D is a diagrammatic view of a graphical user interface on the rear screen of recipient's multi-camera, multi-screen smartphone showing a chat session with the user's multi-camera, multi-screen smartphone, according to an illustrative embodiment.

FIG. 5D is a graphical user interface on the rear screen of recipient's multi-camera, multi-screen smartphone showing a chat session with the user's multi-camera, multi-screen smartphone, according to an illustrative embodiment. A recipient's rear screen 522 can show images collected from one or more of the cameras on a user's phone, and can show a small picture-in-picture image taken from the recipient's rear camera. By way of non-limiting example, image tile 512 can show video recorded by the user's front camera, image tile 514 can show video recorded by the user's rear camera, image tile 516 can show video recorded by the user's left side camera, and image tile 518 can show video recorded by the user's right side camera. However, it should be clear that the arrangement and number of tiles can be varied. For example, if only one, two, or three cameras of the user's phone are imaging participants, one, two, or three corresponding image tiles can be displayed on the recipient's rear screen 522. An image tile 504 can be presented as a PIP showing the video being collected from the recipient's rear camera and sent to the user's phone. A recipient can optionally rearrange the placement of tiles, if desired, for example, by clicking and dragging any of the tiles 512, 514, 516, 518, or 504 into a different location on the rear screen 522.

Figure 5E:
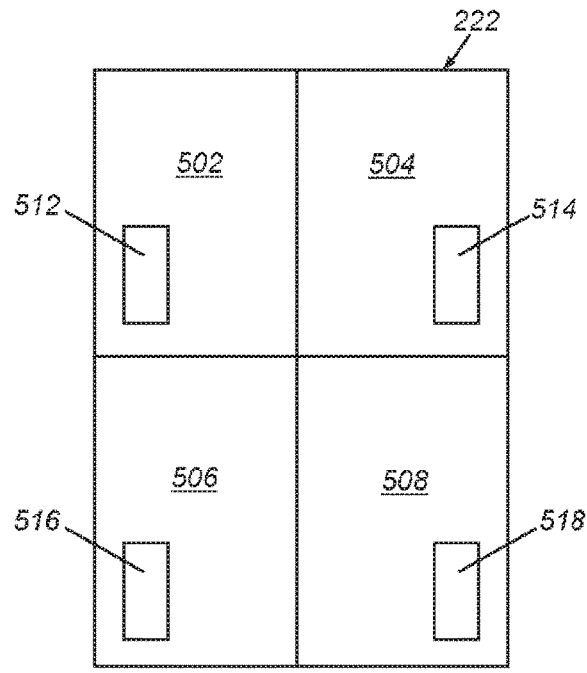
FIG. 5E is a diagrammatic view of a graphical user interface on the front screen of a user's multi-camera, multi-screen smartphone including multiple Picture in Pictures (PIPs) showing images from the user's cameras, according to an illustrative embodiment.

FIG. 5E is a graphical user interface on the front screen of a user's multi-camera, multi-screen smartphone including multiple PIPs showing images from the user's cameras, according to an illustrative embodiment. In various embodiments, in addition to showing one or more image tiles showing video recorded from one or more cameras on the recipient's phone, the front screen 222 and/or rear screen of a user's phone can show one or more PIPs showing images recorded by the user's front, rear, left side, and/or right side cameras. By way of non-limiting example, front screen 222 can include the recipient's front camera image tile 502 with a PIP of the user's front camera image tile 512, the recipient's rear camera image tile 504 with a PIP of the user's rear camera image tile 514, the recipient's left camera image tile 506 with a PIP of the user's left camera image tile 516, and the recipient's right camera image tile 508 with a PIP of the user's right camera image tile 518. However, it should be clear that in various embodiments, fewer than all cameras or tiles may be used, and that the arrangement of tiles can be varied. Similarly, multiple tiles and PIPs can be presented on the user's rear screen, the recipient's front screen, and/or the recipient's rear screen.

Figure 5F:
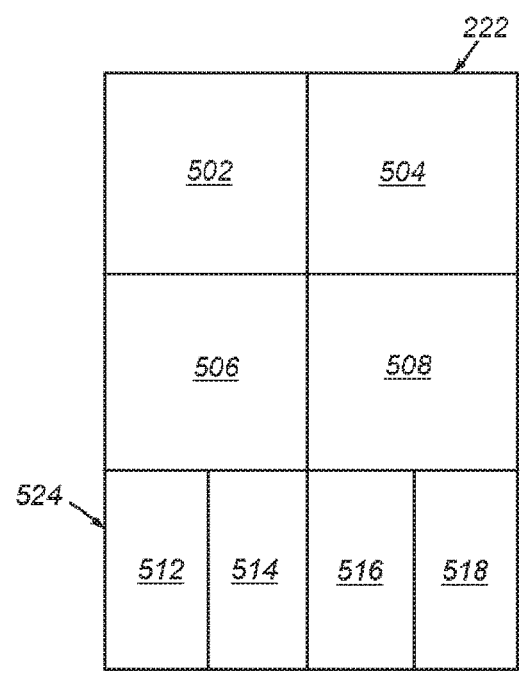
FIG. 5F is a diagrammatic view of a graphical user interface on the front screen of a user's multi-camera, multi-screen smartphone including multiple mini-tiles showing images from the user's cameras in a mini-tile stripe, according to an illustrative embodiment.
Figure 5G:
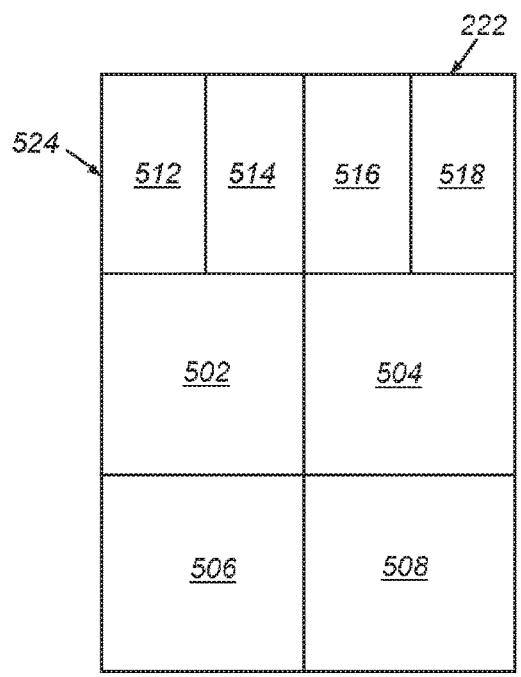
FIGS. 5G-5K are diagrammatic views of graphical user interfaces on the front screen of a user's multi-camera, multi-screen smartphone showing the mini-tile stripe in various locations and arrangements on the user's screen, according to various illustrative embodiments.
Figure 5H:
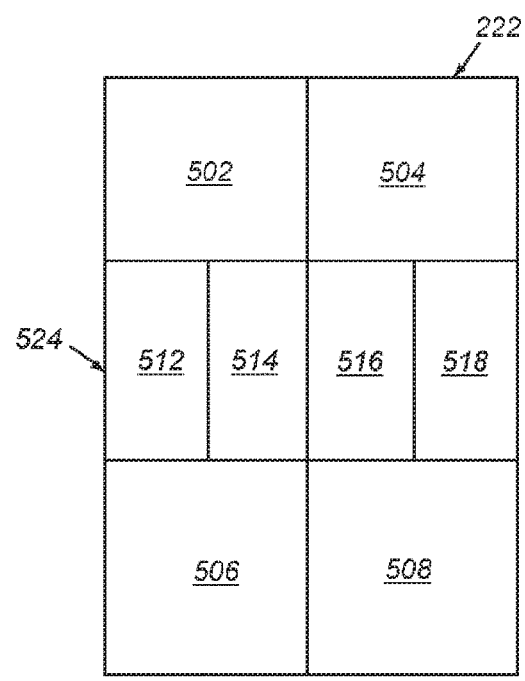

FIG. 5F is a graphical user interface on the front screen of a user's multi-camera, multi-screen smartphone including multiple mini-tiles showing images from the user's cameras, according to an illustrative embodiment. In various embodiments, in addition to showing one or more image tiles showing video recorded from one or more cameras on the recipient's phone, the front screen 222 and/or rear screen of a user's phone can show one or more mini-tiles showing images recorded by the user's front, rear, left side, and/or right side cameras. As shown in FIG. 5F, mini-tiles of the image tile 512 showing the user's front camera, image tile 514 showing the user's rear camera, image tile 516 showing the user's left side camera, and image tile 518 showing the user's right side camera can be presented together in a mini-tile stripe 524 at the bottom of the screen, so that each tile is presented separately. Tiles can be presented so that no tile overlaps with, or interferes with another tile. The mini-tiles showing the images collected from the user's cameras can shown without (free of) blocking other image tiles. In various embodiments, the mini-tile can be arranged in a mini-tile stripe 524 at the top of the screen as shown in FIG. 5G, or in a mini-tile stripe in the middle of the screen as shown in FIG. 5H, without (free of) blocking other image tiles.

Figure 5I:
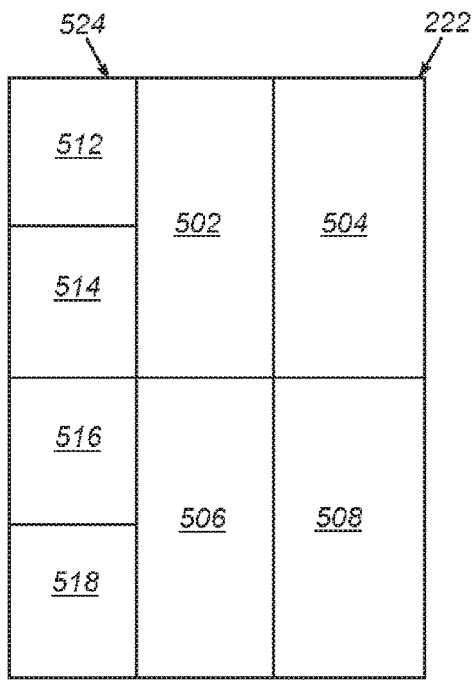
Figure 5J:
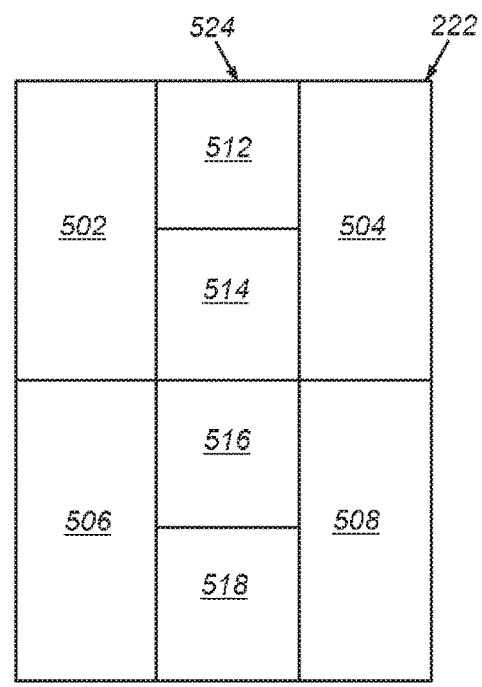
Figure 5K:
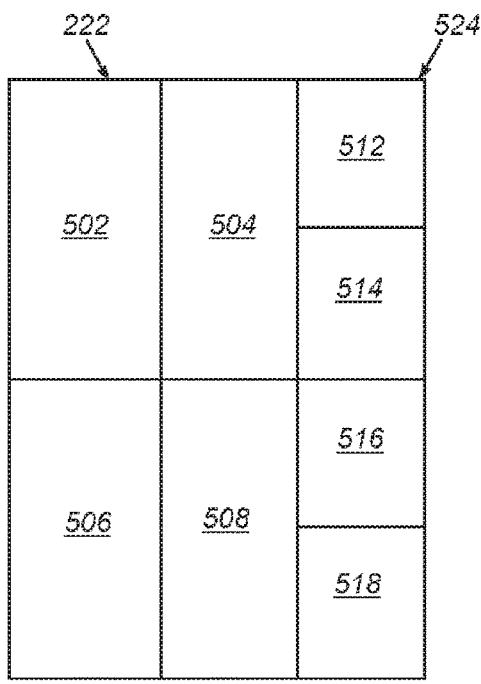

In various embodiments, the mini-tiles can be arranged in a vertical mini-tile strip 524 along the left side of the screen, as shown in FIG. 5I, in a vertical mini-tile strip 524 down the center of the screen, as shown in FIG. 5J, or in a vertical mini-tile stripe 524 along the right side of the screen, as shown in FIG. 5K. It should be clear that any of the above arrangements of tiles can also be implemented on the user's rear screen, the recipient's front screen, and/or the recipient's rear screen.

Figure 5L:
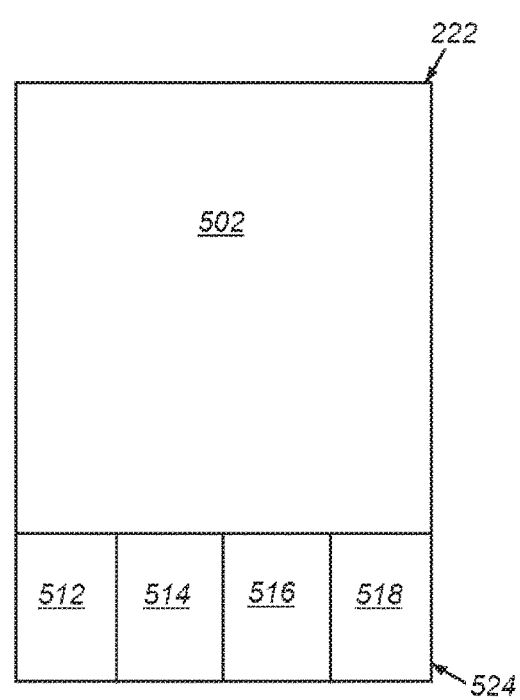
FIG. 5L is a diagrammatic view of a graphical user interface on the front screen of a user's multi-camera, multi-screen smartphone with a mini-tile stripe and a single video image from the recipient's camera, according to an illustrative embodiment.

FIG. 5L is a graphical user interface on the front screen of a user's multi-camera, multi-screen smartphone with a mini-tile stripe and a single video image from the recipient's camera, according to an illustrative embodiment. A user with a multi-camera, multi-screen smartphone can receive a single video stream from a single camera, such as the front camera, of the recipient's phone. A user's screen can have an image tile 502 showing video recorded by the recipient's front camera and a mini-tile stripe 524, or an image tile 504 showing video recorded by the recipient's rear camera along with a mini-tile stripe 524, or various other combinations of video streams shown on the user's screen 522. It should be clear that the user's screen(s) can have one or more image tiles from cameras on the recipient's phone, along with one or more images from cameras on the user's phone that can optionally be arranged in a mini-tile stripe.

Figure 6:
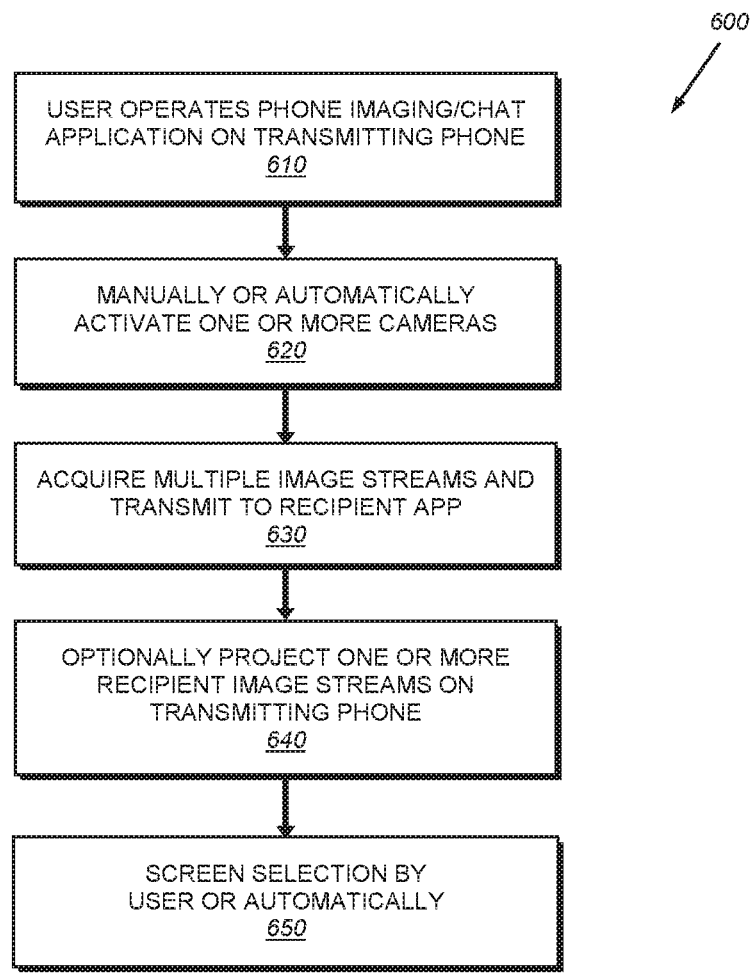
FIG. 6 is a flow diagram of a generalized procedure for operating a video chat application for use with the multi-camera, multi-screen smartphone of FIG. 1.

FIG. 6 briefly describes a procedure 600 for operating a multi-camera, multi-display smartphone and video chat application according to an exemplary embodiment. As shown, the user operates his or her smartphone imaging and/or video chat application so that the smartphone's operating system begins any communication and related operations. This can include notifying the recipient smartphone (over the wireless network) that the transmitting user smartphone wishes to have a chat (step 610). The user smartphone can automatically activate the cameras that surround the housing—or these can be activated manually. The activation can include a motion detection (or IR-sensing) function that only operates cameras on which active subjects are present (step 620). Then, the camera(s) acquire images of the subjects within their field of view and pick up any accompanying audio. One, two, three, or four camera(s) can acquire images of subjects, and various cameras can acquire images of different subjects that are in different positions around the longitudinal axis of the phone. This data is translated into one or more image data streams, with appropriate (e.g.) mpeg data compression, etc., as should be clear to those in the art. The video/audio data streams are packetized and transmitted over the network to the recipient smartphone (step 630), where they are received by the recipient and displayed in a manner desired by the recipient's chat application (e.g. multiple, split screens, a blended image, etc.). The recipient's screen can display the images from the one, two, three, or four cameras showing the imaged subjects together on a single screen, using for example, a split screen or tiled screen. Likewise, the user smartphone receives one or more image data streams from the recipient in step 640, and these streams are displayed to the user and/or his/her audience in an appropriate manner using the front and rear displays in step 640. The user's smartphone can show the same display on both the front and the back screen, so that each of the subjects can see the image data stream(s) being sent from the recipient phone. The nature of the display on the user's smartphone can be controlled via manual settings and/or automatic processes (block 650).

Figure 7:
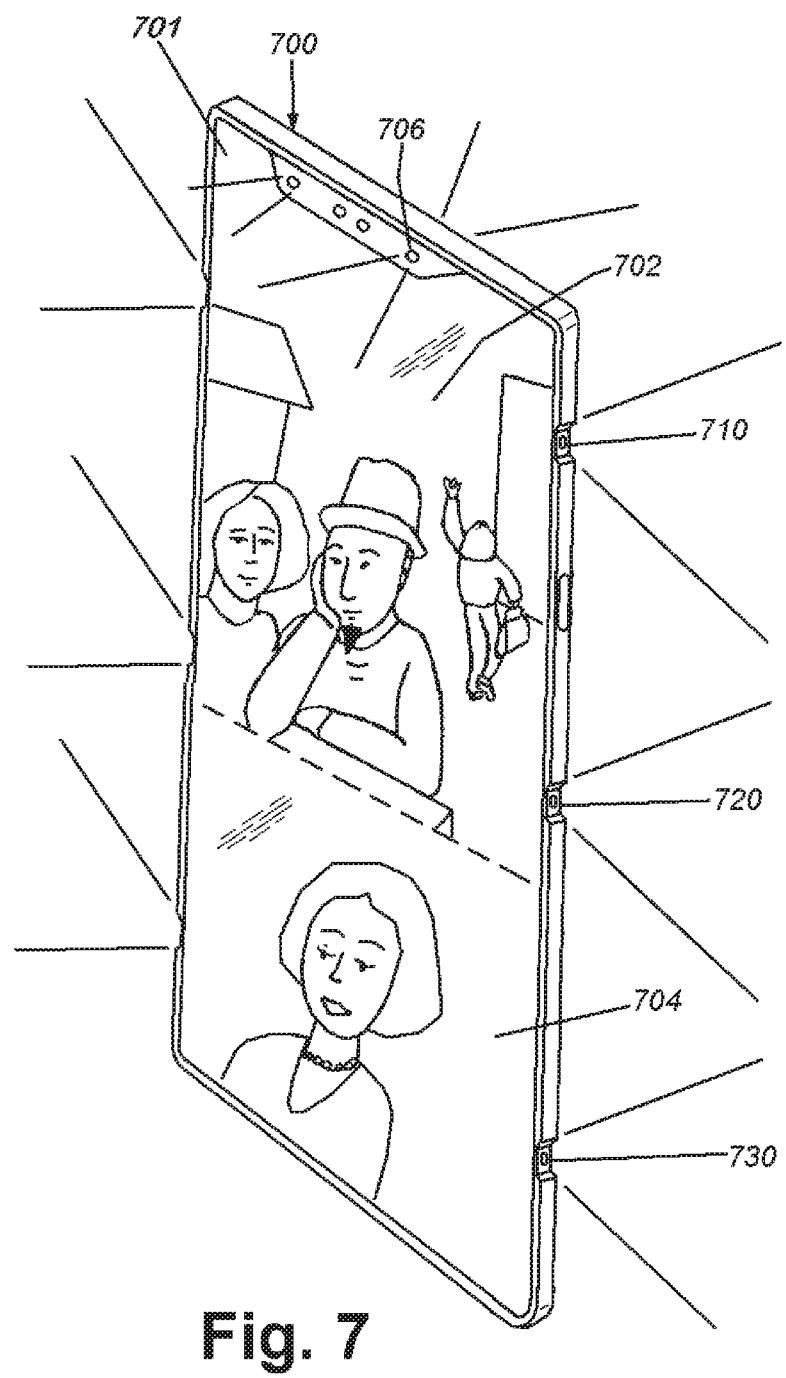
FIG. 7 is a perspective view of a smartphone with cameras located on the front, back, and both sides of the smartphone, according to an illustrative embodiment.

FIG. 7 is a perspective view of a smartphone with cameras located on the front, back, and both sides of the smartphone, according to an illustrative embodiment. A user's smartphone 700 can show two or more video image data streams taken from two or more cameras on the recipient's smartphone. As shown in FIG. 7, the upper image data stream 702 can be taken from the recipient's rear camera, and the lower image data stream 704 can be taken from the recipient's front camera, however, the arrangement of images data streams can be varied and can be adjustable by the user. Multiple image streams, such as upper image data stream 702 and lower image data stream 704 can be shown on the front screen 701 and/or the rear screen 709. The same image data streams can be shown on both screens.

Figure 8:
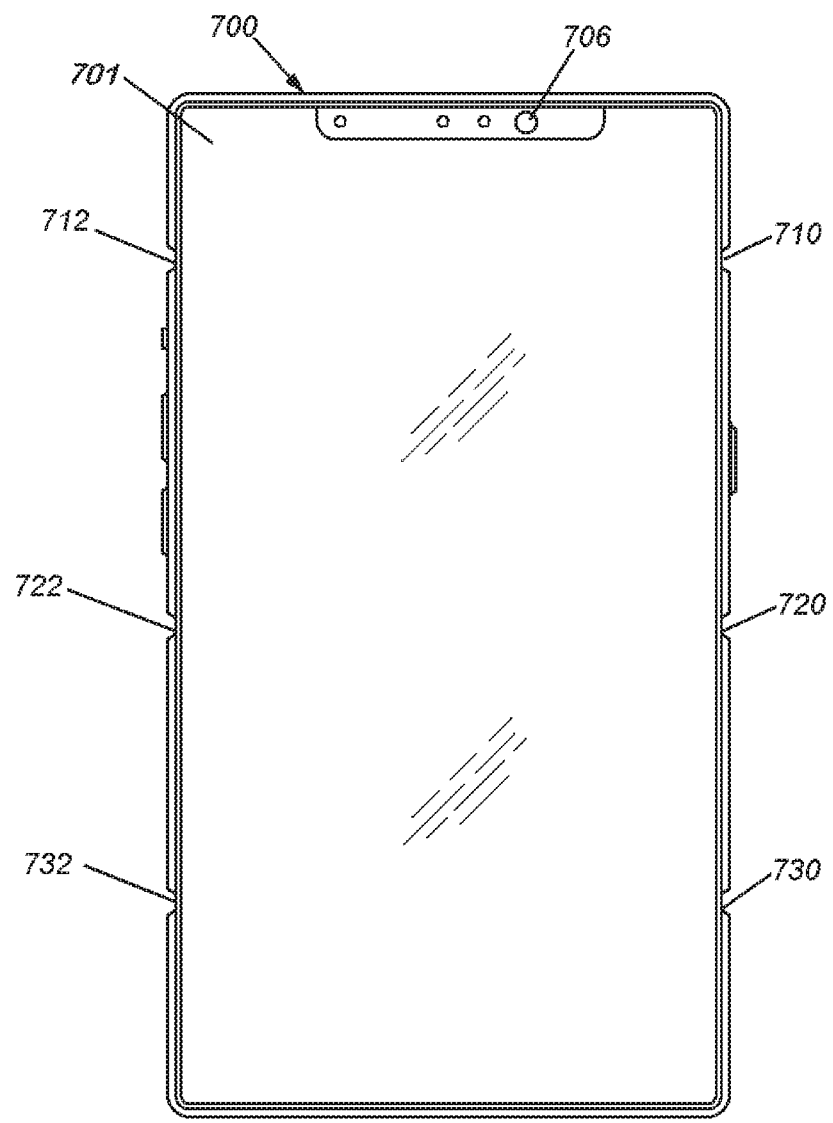
FIG. 8 is a front view of the smartphone with cameras located on the front, back, and both sides of the smartphone, according to an illustrative embodiment.

The user's smartphone 700 can have a front camera 706 and a rear camera 708. The user's smartphone can also have cameras in one or more positions along the side of the phone. FIG. 8 is a front view of the smartphone with cameras located on the front, back, and both sides of the smartphone, according to an illustrative embodiment. Turning to FIGS. 7 and 8, the smartphone 700 can have side cameras 710 and 712 located in the upper portion of the smart phone, and in various embodiments the smartphone can also have side cameras 730 and 732 located in the lower portion of the smartphone, and/or side cameras 720 and 722 located in additional locations along the side of the smartphone, such as the central area of the smartphone. FIG. 7 depicts three cameras along each side, with a camera in the upper portion, a camera in the central portion, and a camera in the lower portion, however, it should be clear that in various embodiments, different numbers of cameras and/or different arrangements of cameras along the side of the smartphone are also possible. Having multiple cameras along the sides of the phone can allow the chat app to select different cameras to obtain the best view of the chat participants. Different handhold positions, or different types of tripods or other phone holders, can all block different cameras while leaving other cameras exposed to collect video image data of the surrounding scene. Having multiple cameras on each side allows the chat app to collect video data from exposed cameras while other cameras may be blocked.

Figure 9:
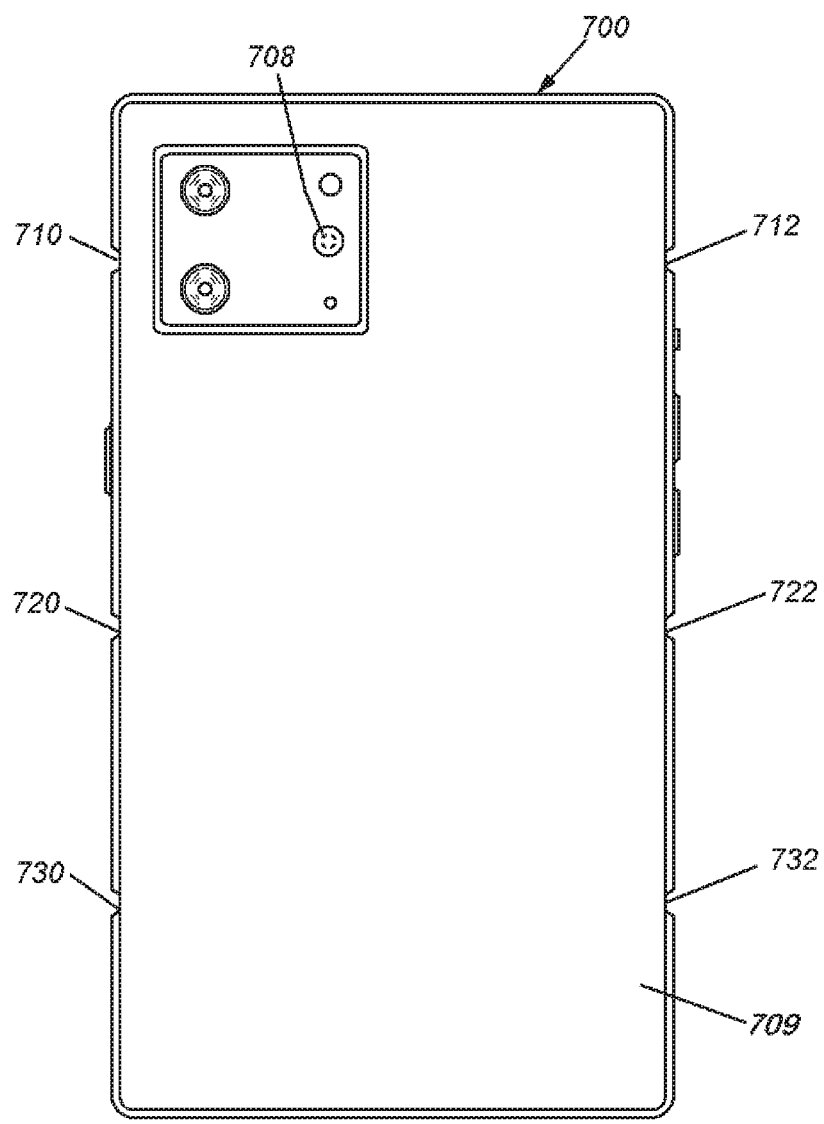
FIG. 9 is a rear view of the smartphone with cameras located on the front, back, and both sides of the smartphone, according to an illustrative embodiment.
Figure 10:
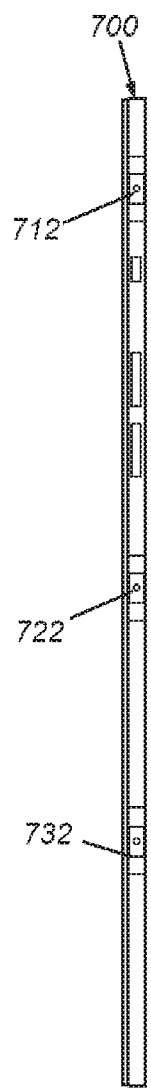
FIG. 10 is a left side view of the smartphone with cameras located on the front, back, top, bottom, and both sides of the smartphone, according to an illustrative embodiment.
Figure 11:
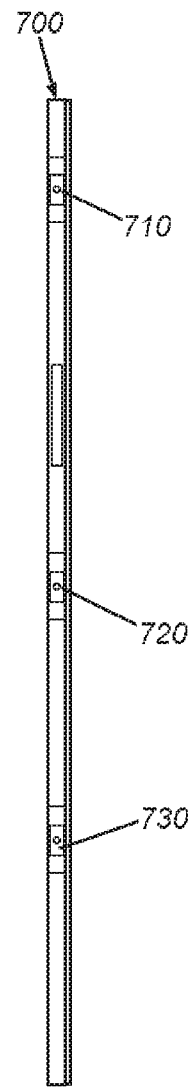
FIG. 11 is a right side view of the smartphone with cameras located on the front, back, top, bottom, and both sides of the smartphone, according to an illustrative embodiment.

FIG. 9 is a rear view of the smartphone with cameras located on the front, back, and both sides of the smartphone, according to an illustrative embodiment. FIG. 10 is a left side view, and FIG. 11 is a right side view of the smartphone with cameras located on the front, back, top, bottom, and both sides of the smartphone, according to an illustrative embodiment. Side cameras 710, 712, 720, 722, 730, and 732 can be located in various positions along the sides of the smartphone, and the smartphone can have three, more than three, or fewer than three cameras along each side.

Figure 12:
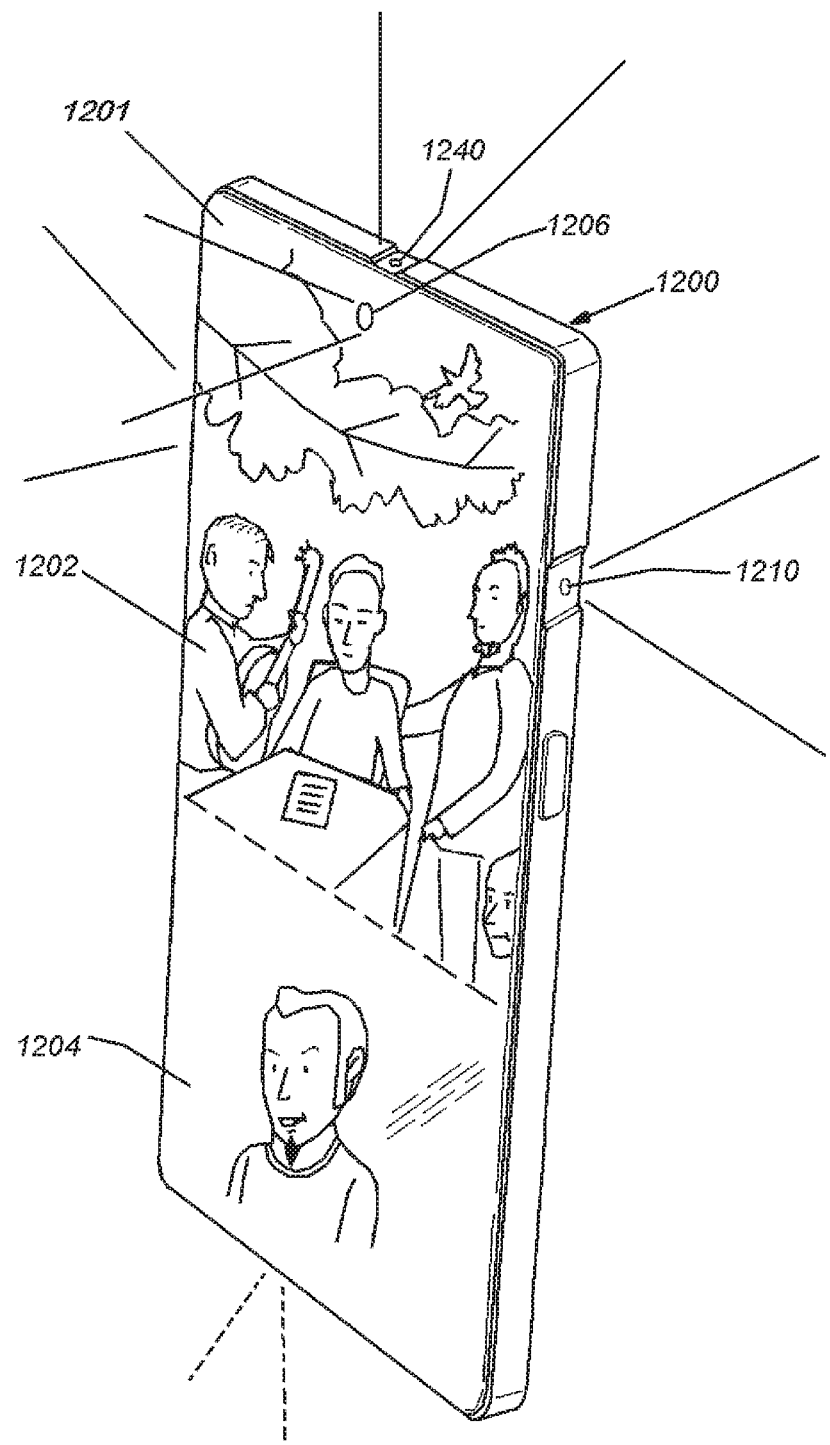
FIG. 12 is a perspective view of a smartphone with cameras located on the front, back, top, bottom, and both sides of the smartphone, according to an illustrative embodiment.

FIG. 12 is a perspective view of a smartphone with cameras located on the front, back, top, bottom, and both sides of the smartphone, according to an illustrative embodiment. A user's smartphone 1200 can show two or more video image data streams taken from two or more cameras on the recipient's smartphone. As shown in FIG. 12, the upper image data stream 1202 can be taken from the recipient's rear camera, and the lower image data stream 1204 can be taken from the recipient's front camera, however, the arrangement of images data streams can be varied and can be adjustable by the user. Upper image data stream 1202 and lower image data stream 1204 can both be displayed on front screen 1201.

Figure 13:
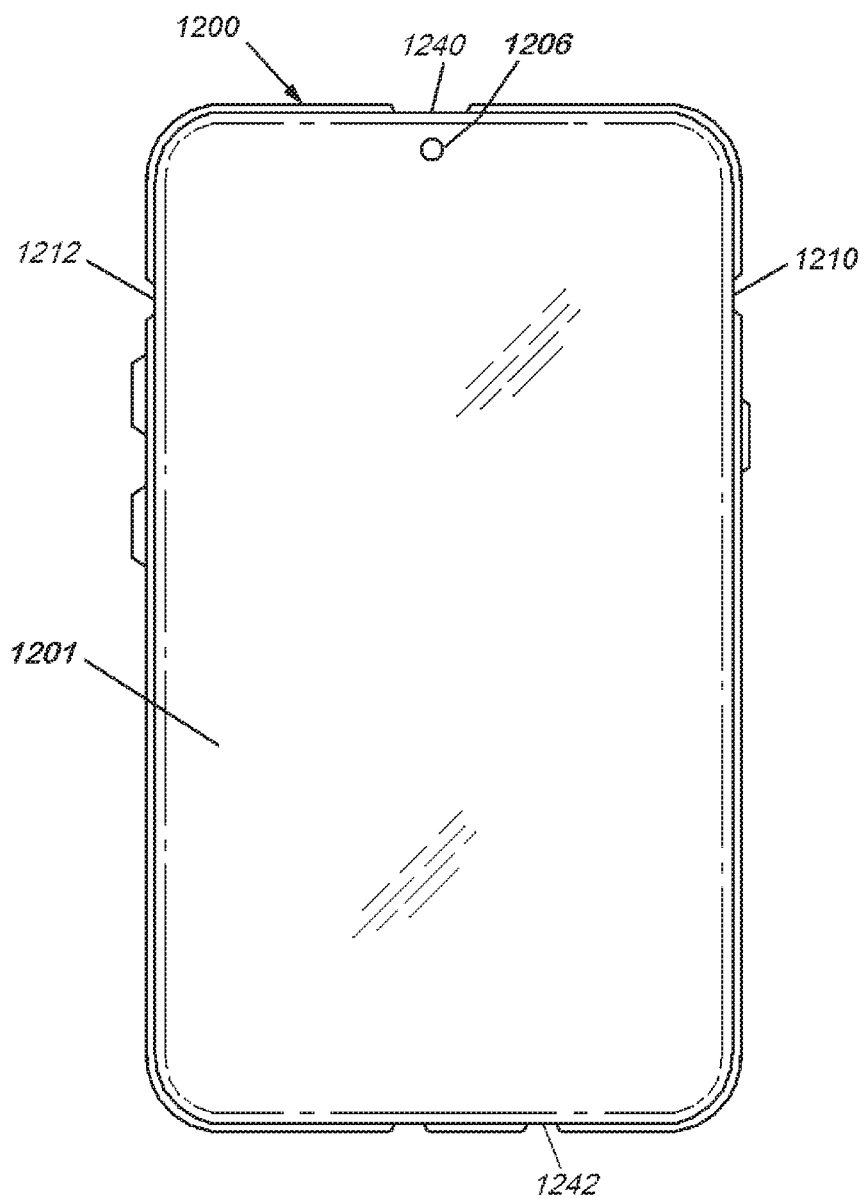
FIG. 13 is a front view of the smartphone with cameras located on the front, back, top, bottom, and both sides of the smartphone, according to an illustrative embodiment.

The user's smartphone 1200 can have a front camera 1206 and a rear camera 1208. The user's smartphone can have side cameras 1210 in one or more positions along the side of the phone. The user's smartphone can have one or more top cameras 1240 along the top of the smartphone, and one or more bottom cameras along the bottom of the phone. FIG. 13 is a front view of the smartphone with cameras located on the front, back, top, bottom, and both sides of the smartphone, according to an illustrative embodiment. Turning to FIGS. 12 and 13, the smartphone 1200 can have two or more side cameras 1210 and 1212 along the sides of the smartphone. The smartphone can have one or more top camera 1240 and one or more bottom camera 1242. In various embodiments, different numbers of cameras and/or different arrangements of cameras along the top and bottom of the smartphone are also possible. Having cameras 1240 and 1242 along the top and bottom of the smartphone can allow the chat app to collect video image data from all directions around the smartphone, including both sides, when the smartphone is being held sideways. That is to say, when the smartphone is held in a lengthwise or landscape orientation, the top and bottom cameras can collect video image data from areas at the sides of the smartphone, so that the chat app can see all of the 360 degrees surrounding the smartphone. The top camera 1240 and bottom camera 1242 can also be referred to as side cameras. Top camera 1240 can be referred to as a right side camera, and bottom camera 1242 can be referred to as a left side camera.

Figure 14:
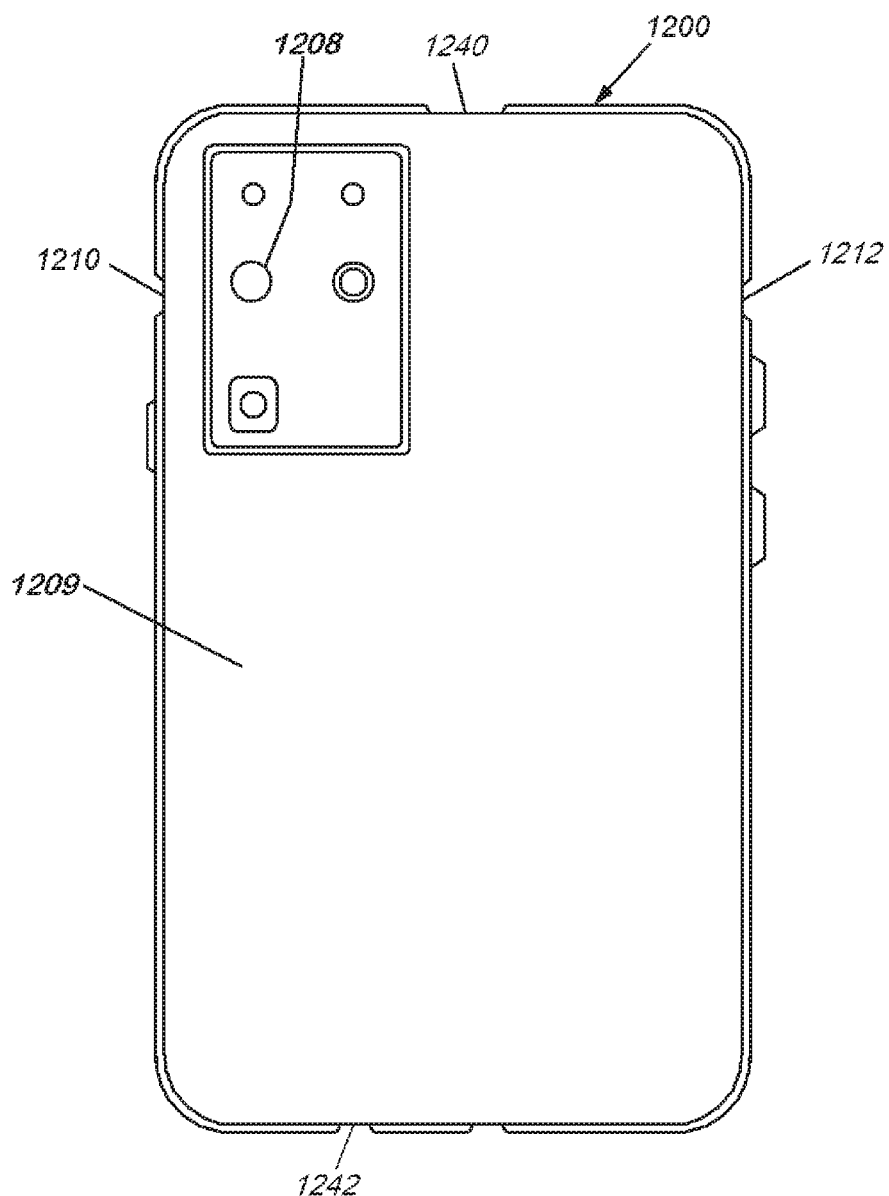
FIG. 14 is a rear view of the smartphone with cameras located on the front, back, top, bottom, and both sides of the smartphone, according to an illustrative embodiment.
Figure 15:
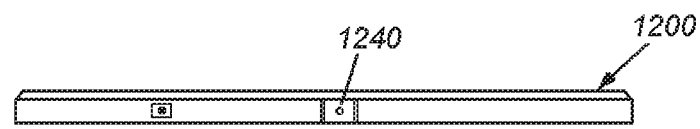
FIG. 15 is a top view of the smartphone with cameras located on the front, back, top, bottom, and both sides of the smartphone, according to an illustrative embodiment.
Figure 16:
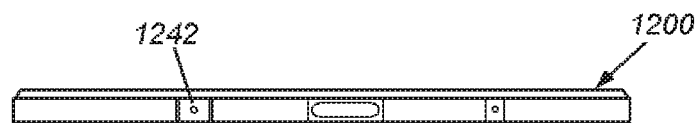
FIG. 16 is a bottom view of the smartphone with cameras located on the front, back, top, bottom, and both sides of the smartphone, according to an illustrative embodiment.
Figure 17:
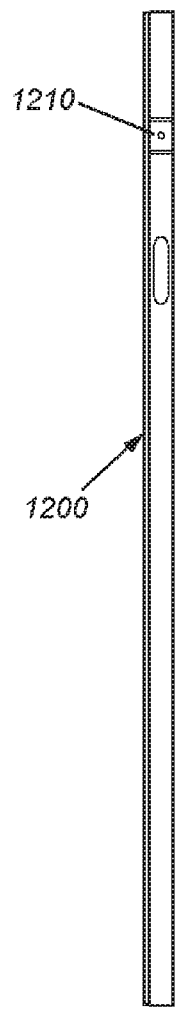
FIG. 17 is a right side view of a smartphone with cameras located on the front, back, top, bottom, and both sides of the smartphone, according to an illustrative embodiment.
Figure 18:
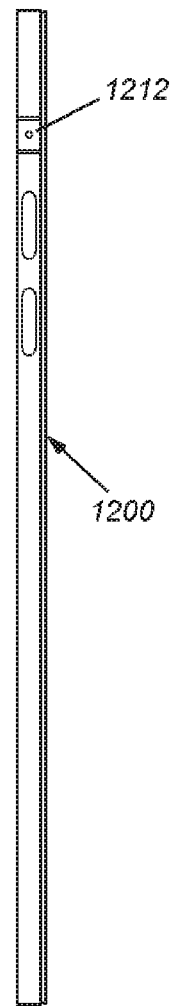
FIG. 18 is a left side view of a smartphone with cameras located on the front, back, top, bottom, and both sides of the smartphone, according to an illustrative embodiment.

FIG. 14 is a rear view of the smartphone with cameras located on the front, back, top, bottom, and both sides of the smartphone, according to an illustrative embodiment. The smartphone 1900 can have a rear screen 1209 on the back of the smartphone. FIG. 15 is a top view, and FIG. 16 is a bottom view of the smartphone with cameras located on the front, back, top, bottom, and both sides of the smartphone, according to an illustrative embodiment. FIG. 17 is a right side view, and FIG. 18 is a left side view of a smartphone with cameras located on the front, back, top, bottom, and both sides of the smartphone, according to an illustrative embodiment. Two or more side cameras 1210 and 1212, one or more top cameras 1240, and one or more bottom cameras 1242 can be located along the periphery of the smartphone. The smartphone can have more cameras than shown, and the arrangements of cameras can be different than shown. In various embodiments, cameras can be located in various positions around the peripheral edge of the smartphone, including the top, bottom, sides, corner regions between the top and the sides, corner regions between the bottom and the sides, or various positions around the edges of the smartphone. Cameras in different positions around the smartphone can allow the chat app to see all sides of the smartphone regardless of the orientation of the smartphone.

Figure 19A:
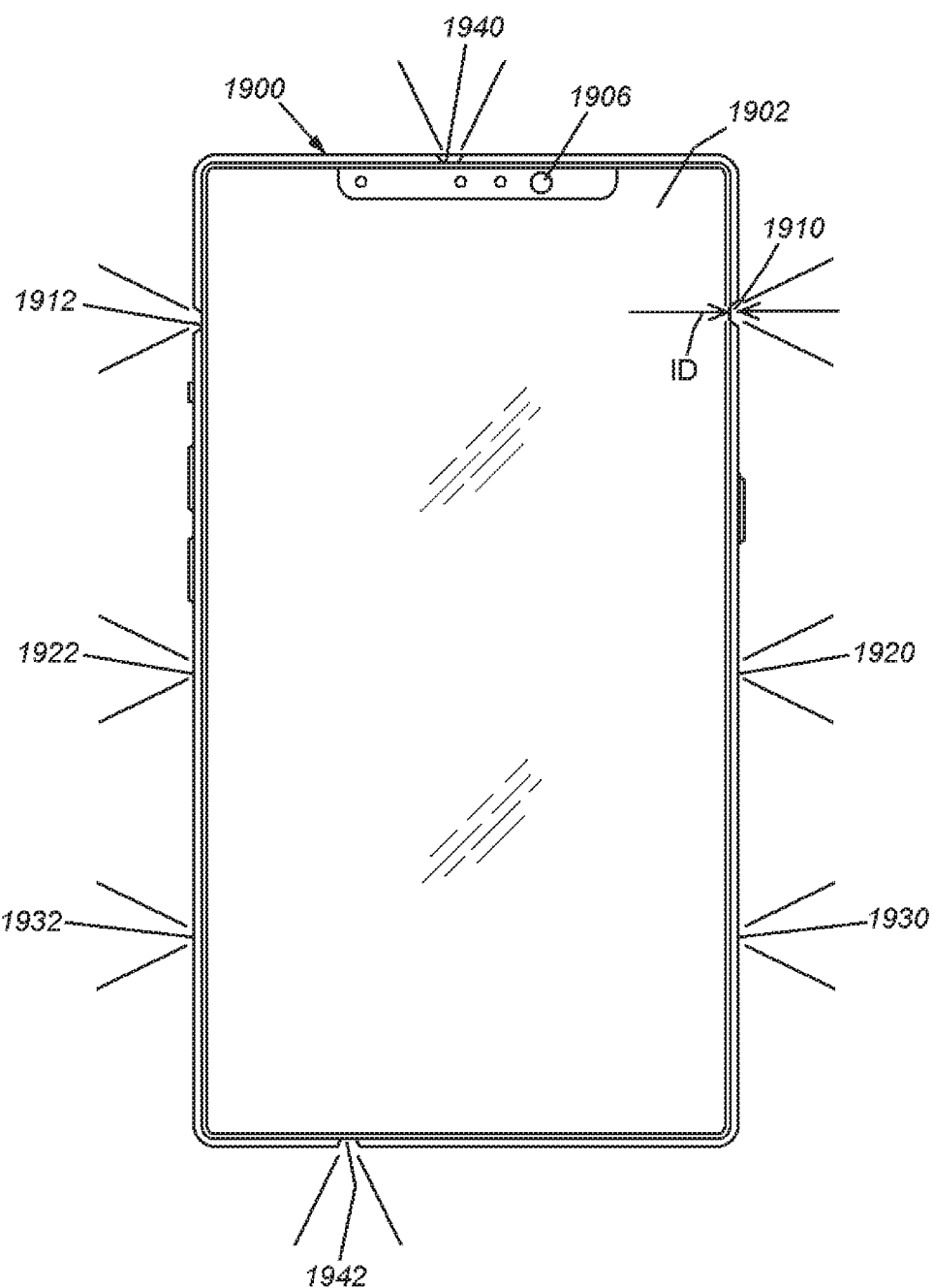
FIG. 19A is a front view of a smartphone with multiple cameras, according to an illustrative embodiment.

FIG. 19A is a front view of a smartphone with multiple cameras, according to an illustrative embodiment. Smartphone 1900 can have a front screen 1902, front camera(s) 1906, side cameras 1910, 1912, 1920, 1922, 1930, 1932, top camera 1940, and bottom camera 1942. Cameras can be located on the front, rear, sides, top, and bottom, along with various corner regions, etc. Cameras can be flush with the edge of the phone, such as cameras 1920 and 1922, or can be inset such as cameras 1910 and 1912. Cameras can be inset by an inset distance ID that can be in a range between 0 and 5 mm. Cameras can point directly out, or can be cocked or angled. Some cameras, such as cameras 1930 and 1932 can be broad-angle lenses, or fish-eye lenses to capture broad ranges of a scene. Different types of cameras, cameras in different positions, cameras at different angles or insets, etc., can allow the chat app to have access to a variety of different video image data streams that can each be useful in different situations.

Figure 19B:
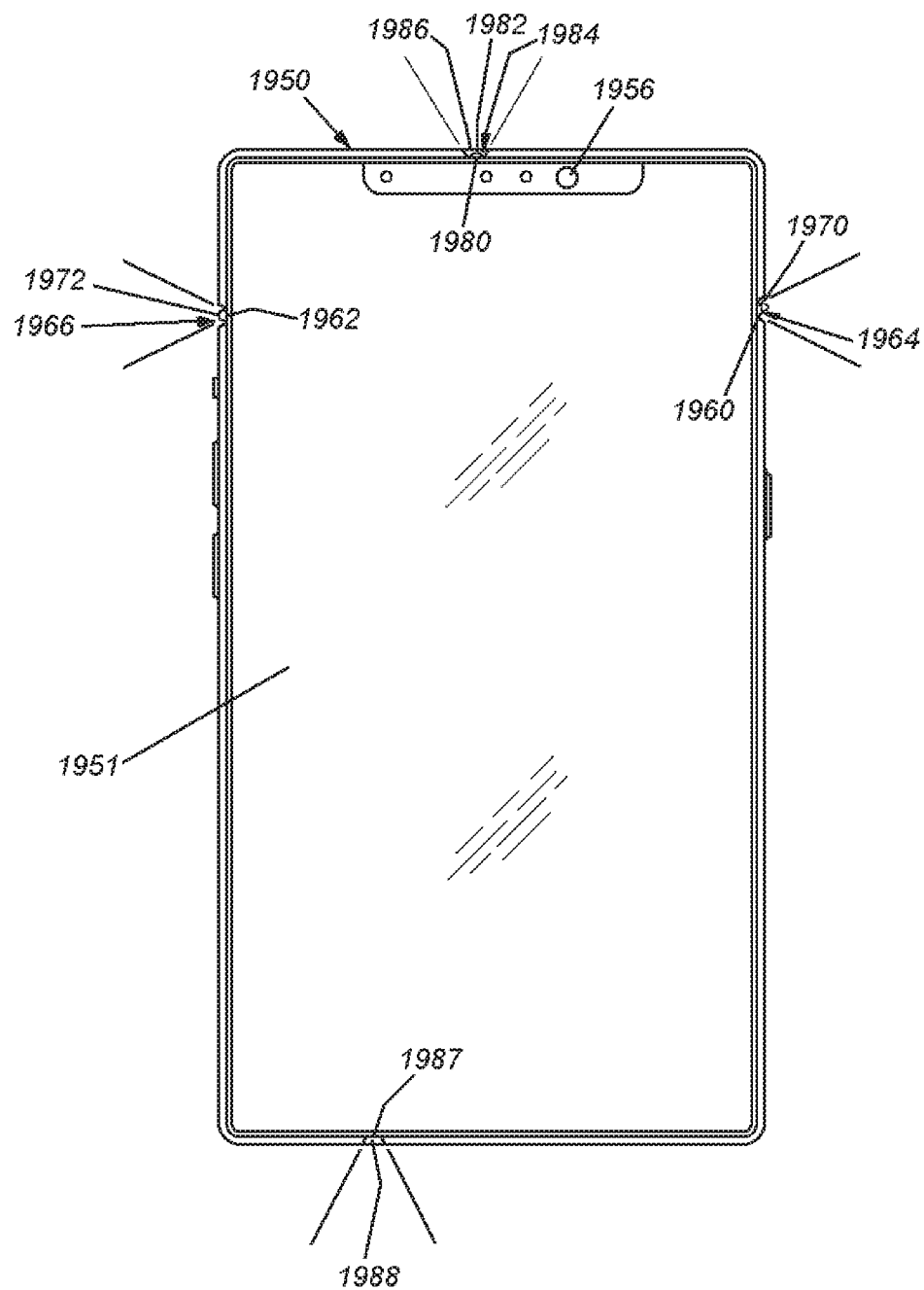
FIG. 19B is a front view of a smartphone with multiple wide-angle cameras, according to an illustrative embodiment.

FIG. 19B is a front view of a smartphone with multiple wide-angle cameras, according to an illustrative embodiment. Smartphone 1950 can have a front screen 1951, front camera(s) 1956, side cameras 1960 and 1962, top camera 1980 and bottom camera 1987. Cameras can be located on the front, rear, sides, top, and bottom, along with various corner regions, etc. In various embodiments, cameras such as cameras 1960 and 1962 can be inset into notches 1964 and 1966. Cameras 1960 and 1962 can have lenses 1970 and 1972 that can extend into notches 1964 and 1966. In various embodiments, lenses 1970 and 1972 can be domed lenses, or bubble lenses, or fish eye lenses. Because lenses 1970 and 1972 extend outward into the notches 1964 and 1966, they can enable cameras 1960 and 1962 to capture images greater than 180 degrees around the sides of the phone.

In various embodiments, cameras such as top camera 1980 can have a lens 1982 extending into notch 1984. Notch 1984 can be covered and/or filled-in with a clear shell 1986. The clear shell 1986 can allow the top and/or sides of the phone to have a smooth, continuous appearance, while also defining a notch that the lens can extend into to allow the lens to focus light from the imaged scene in an arc that is greater than 180 degrees around the sides of the phone. In various embodiments, cameras such as bottom camera 1987 can have a flush covering lens 1988 in the notch. The covering lens 1988 can flushly fill the notch so that the side edge of the phone case defines a smooth, continuous appearance. Appropriate covers and cases can be designed to facilitate this form factor.

Figure 19C:
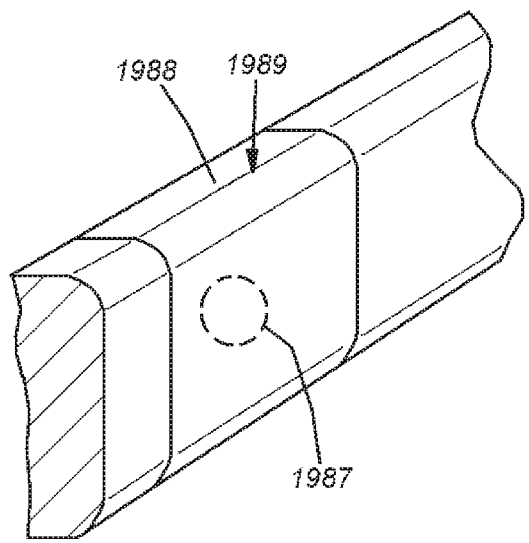
FIG. 19C is an enlarged perspective view of the bottom camera of FIG. 19B, according to an illustrative embodiment.

With more particular reference to FIG. 19C an enlarged perspective view of the bottom camera of FIG. 19B is shown. The smartphone 1950 includes the above-described camera lens 1987 within the notch 1989. The smartphone 1950 can also have a covering lens 1988 that allows the camera to have a field of vision greater than an arc of 180 degrees. This lens 1988 can be constructed to include various optical effects—for example, internally reflective, fish eye-lensmatic and/or prismatic effects—to allow the light to bend to, or beyond an arc of 180 degrees. The lens 1988 can be clear or tinted and conform closely to the edge profile of the surrounding phone case. In fact, in various embodiments, the lens 1988 can be tinted so as to emulate the color of the case (using (e.g.) appropriate dye and/or flash coating techniques). In this manner, the lens can blend almost seamlessly into the surrounding case edge, whist defining optics that provide the 180-degree-plus viewing arc. Note that the lens and cover arrangement 1987 and 1988 of FIGS. 19B and 19C can be placed at any location (or plurality of locations) around the perimeter of the camera case as appropriate to provide the desired imaging effect—for example, it is expressly contemplated that a version of the flush-fitting arrangement can be located on each opposing side edge as described above. Thus the depiction of the positioning of the lens/cover arrangement along the bottom edge of the case should be taken as exemplary. As noted above, an outer protective shell or case can include appropriate windows and/or slots to allow passage of light into the camera in manner clear to those of skill.

Figure 19D:
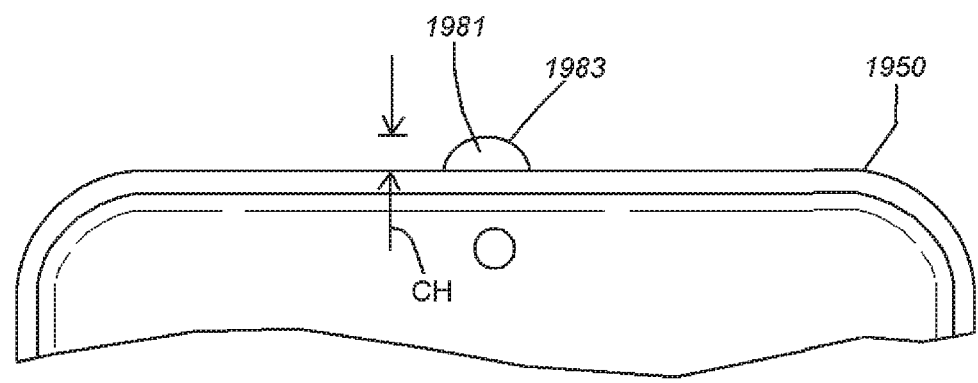
FIG. 19D is front view of the side of a smartphone with an extending camera, according to an illustrative embodiment.

FIG. 19D is front view of the side of a smartphone with an extending camera, according to an illustrative embodiment. In various embodiments, a smartphone 1950 can have a top camera 1981 that can be within a slight bulge 1983 that extends out from the top of the phone. The bulge 1983 can have a curved outer surface. In a non-limiting example, the bulge can extend out from the top of the phone by a camera height CH of up to approximately 5 mm. The camera 1981 that is in a bulge 1983 extending up from the phone can collect image data from more than 180 degrees around the camera. It should be clear that any of the cameras and/or lenses described herein, including recessed cameras, flush cameras, extending cameras, bubble lenses, prismatic lenses, etc. can be used in any location on the phone, and can be used in different combinations with other cameras and lenses.

Figure 19E:
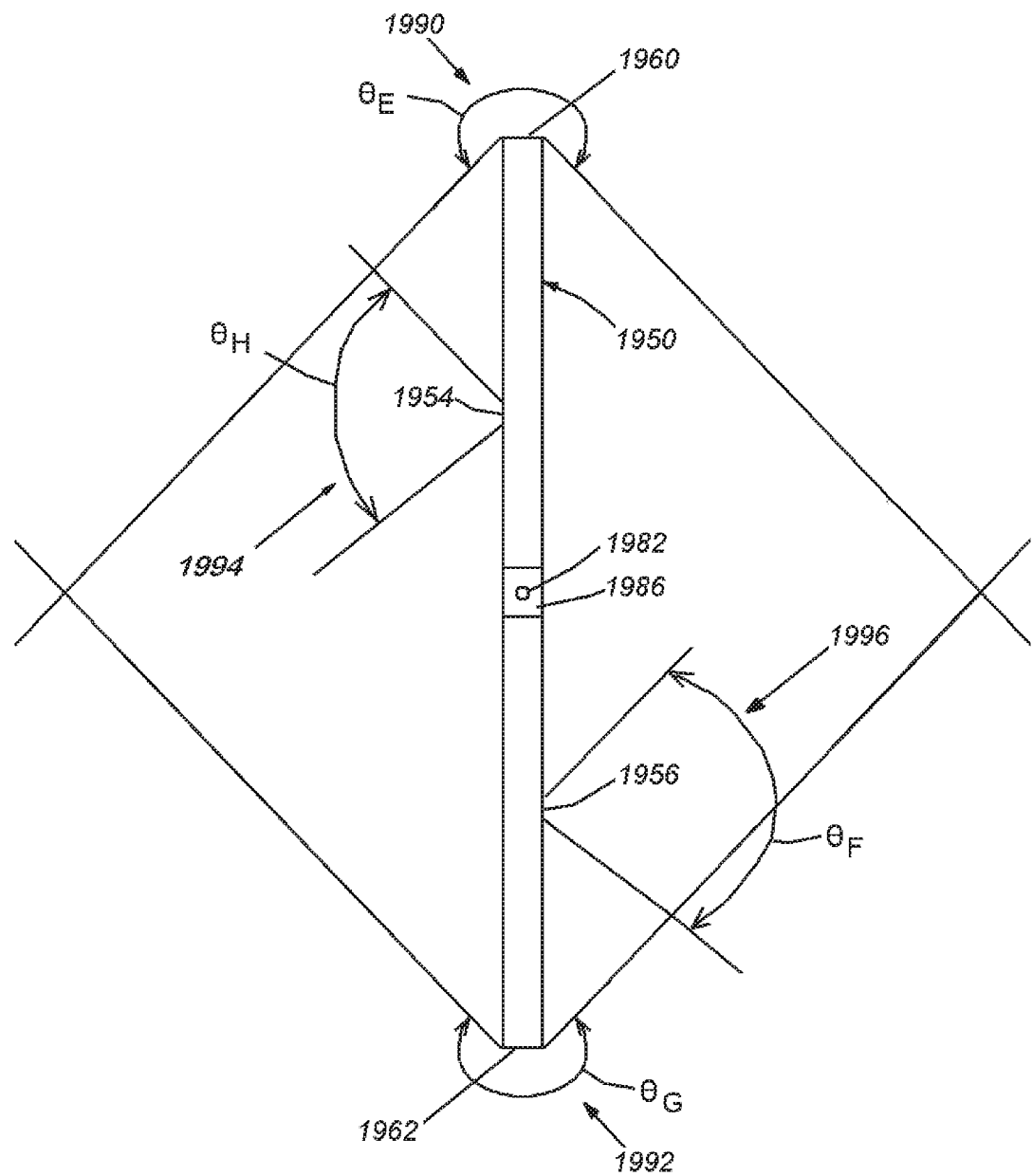
FIG. 19E is a schematic, top-view diagram showing the acquisition of multiple still and/or streaming images using cameras with overlapping fields of view, according to an illustrative embodiment.

FIG. 19E is a schematic, top-view diagram showing the acquisition of multiple still and/or streaming images using cameras with overlapping fields of view, according to an illustrative embodiment. Side cameras 1960 and 1962 can have fields of view 1990 and 1992 with viewing angles $\theta_E$ and $\theta_G$. Viewing angles $\theta_E$ and $\theta_G$ can be up to or more than 180 degrees, so that the viewing angles can overlap. Front camera 1956 and rear camera 1954 can have fields of view 1996 and 1994; with viewing angles $\theta_F$ and $\theta_H$. Fields of view 1994 and 1996 that can overlap with fields of view 1990 and 1992, so that the cameras can produce a complete 360 coverage around the smartphone 1950. The chat app can integrate images from various cameras in different locations around the smartphone, such as cameras 1954, 1956, 1960, and 1962 to create a seamless picture and/or video with 360 degree coverage. The chat app can have the location and field of view of each camera calibrated relative to the location and field of view of neighboring cameras, so that the images from each camera can be stitched together with its neighboring cameras to create a seamless 360 degree picture/video. By way of non-limiting example, images from side camera 1960 can be stitched together with images from front camera 1956 and rear camera 1954 to create a seamless image. Images from other cameras can be stitched together with neighboring cameras in a similar manner to create a complete 360 degree coverage.

Figure 20:
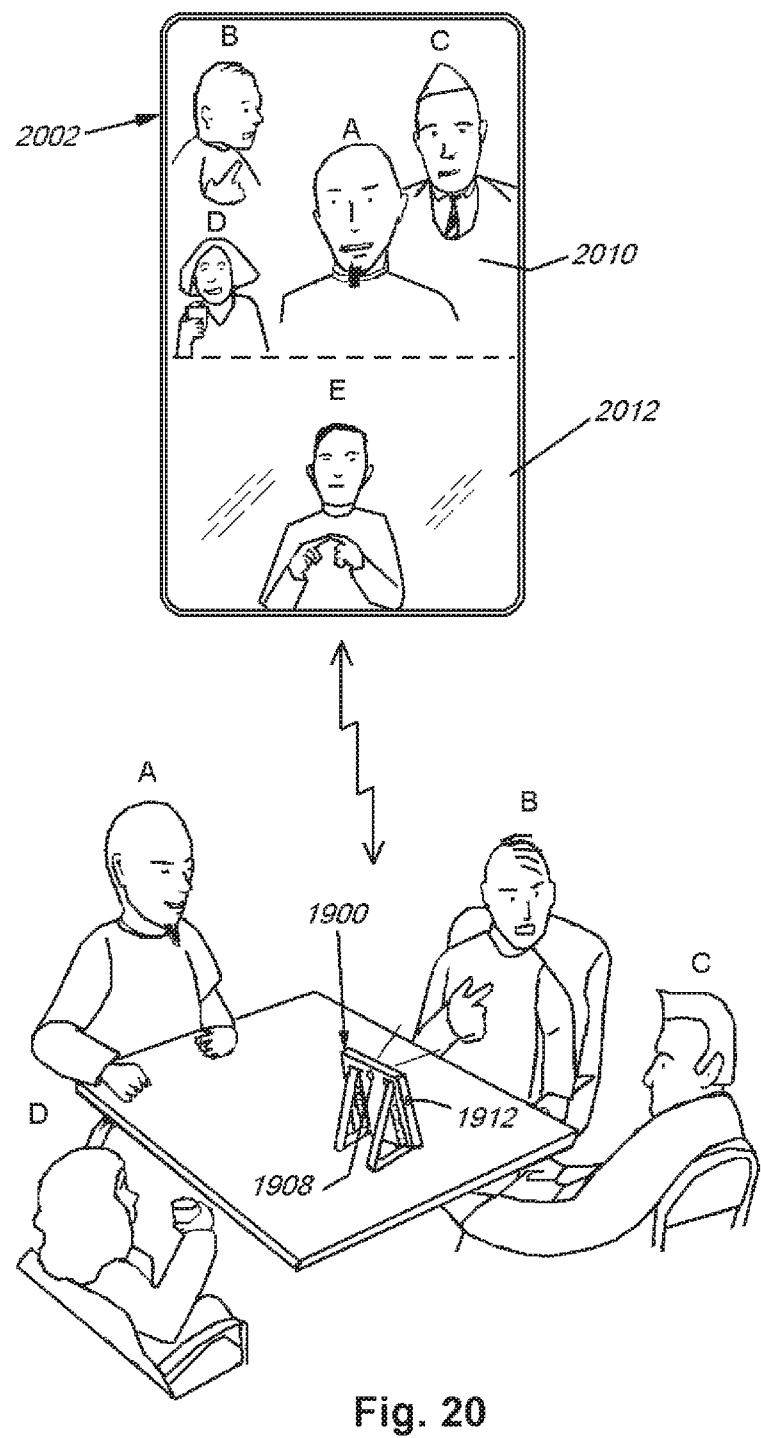
FIG. 20 is a schematic view of four people seated around a smartphone and participating in a video chat with a remote recipient, and showing participants displayed on the remote participant's smartphone, according to an illustrative embodiment.

FIG. 20 is a schematic view of four people seated around a smartphone and participating in a video chat with a remote recipient, and showing participants displayed on the remote participant's smartphone, according to an illustrative embodiment. Participant A, Participant B, Participant C, and Participant D can all participate together in a video chat with a remote participant. A smartphone 1900 can be held by hand, or held in a tripod, stand, or other device so that the smartphone is positioned between various video chat participants. Cameras in various positions around the phone, including a front camera 1906, rear camera 1908, and side cameras 1910 and 1912, can collect video image data of the various participants and stream the video image data to the remote recipient's smartphone screen 2002. Remote recipient's smartphone screen 2002 can display an upper image data stream 2010 showing participants A, B, C, and D, and a lower image data stream 2012 showing the remote participant on his own screen. The remote participant is labeled participant E. As shown in FIG. 20, participant A is speaking, and so participant A is shown as larger than other participants and/or centered in the video being displayed in the upper image data stream 2010. In various embodiments, the chat app can identify which participant is speaking and can increase the image size and/or center the image of the participant who is speaking. The chat app can identify the speaking participant by identifying the direction of the sound, and/or by analyzing the video image to identify which participant is speaking.

Figure 21:
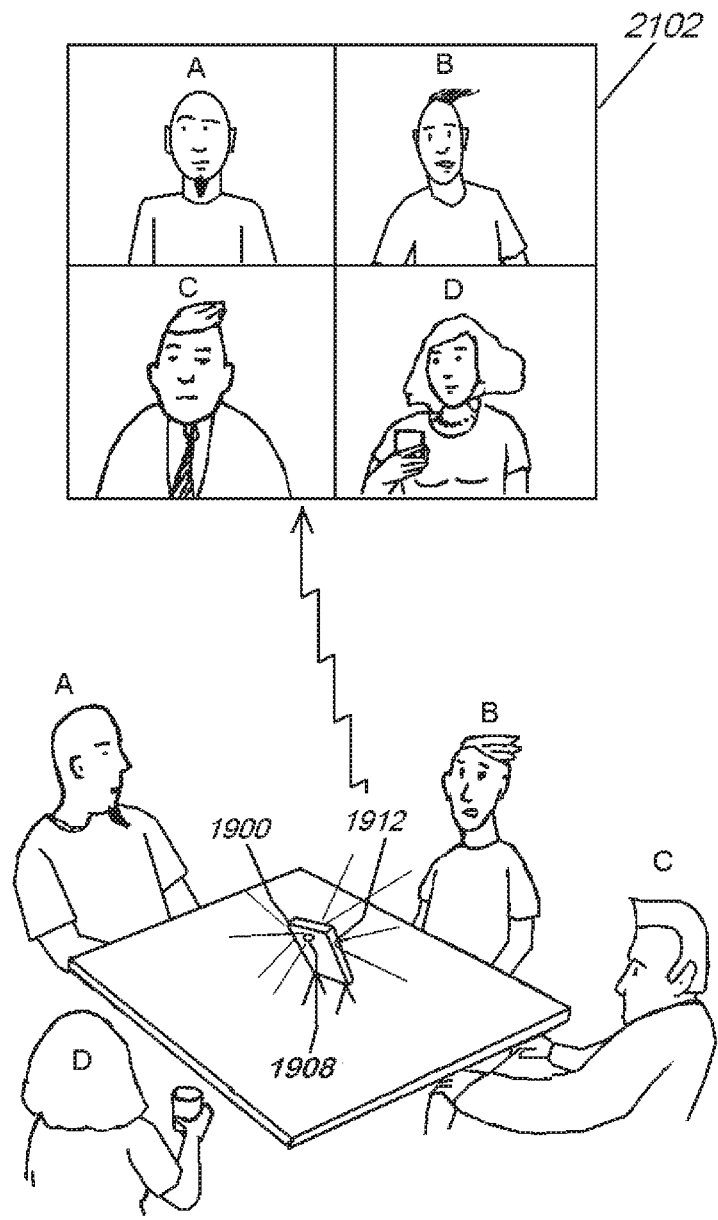
FIG. 21 is a schematic view of four people seated around a smartphone and participating in a video chat with a remote recipient, and showing participants displayed on the remote participant's smartphone in a tiled arrangement, according to an illustrative embodiment.

FIG. 21 is a schematic view of four people seated around a smartphone and participating in a video chat with a remote recipient, and showing participants displayed on the remote participant's smartphone in a tiled arrangement, according to an illustrative embodiment. The remote participant's smartphone screen can display the participants participating at the user's smartphone in a compact tiled display 2102, with four rectangular tiles arranged in a rectangular grid. Various arrangements are possible, and can be varied depending on the number of participants, the preferences of the user, etc. The remote participant may also add his own video image data stream to his screen as a picture within a picture, or as another tile located somewhere on his own screen. The remote participant's tile can be the same size or a different size than the tiles for the participant's from the user's phone, and can occupy a separate part of the screen or can overlay other tiles. Similarly, the user's smartphone screen can show the remote participant, and can also show the local participants A, B, C, and D who are located around the user's smartphone in various arrangements. The remote and local participants can be arranged on the screen in any arrangement as described within this application.

Figure 22:
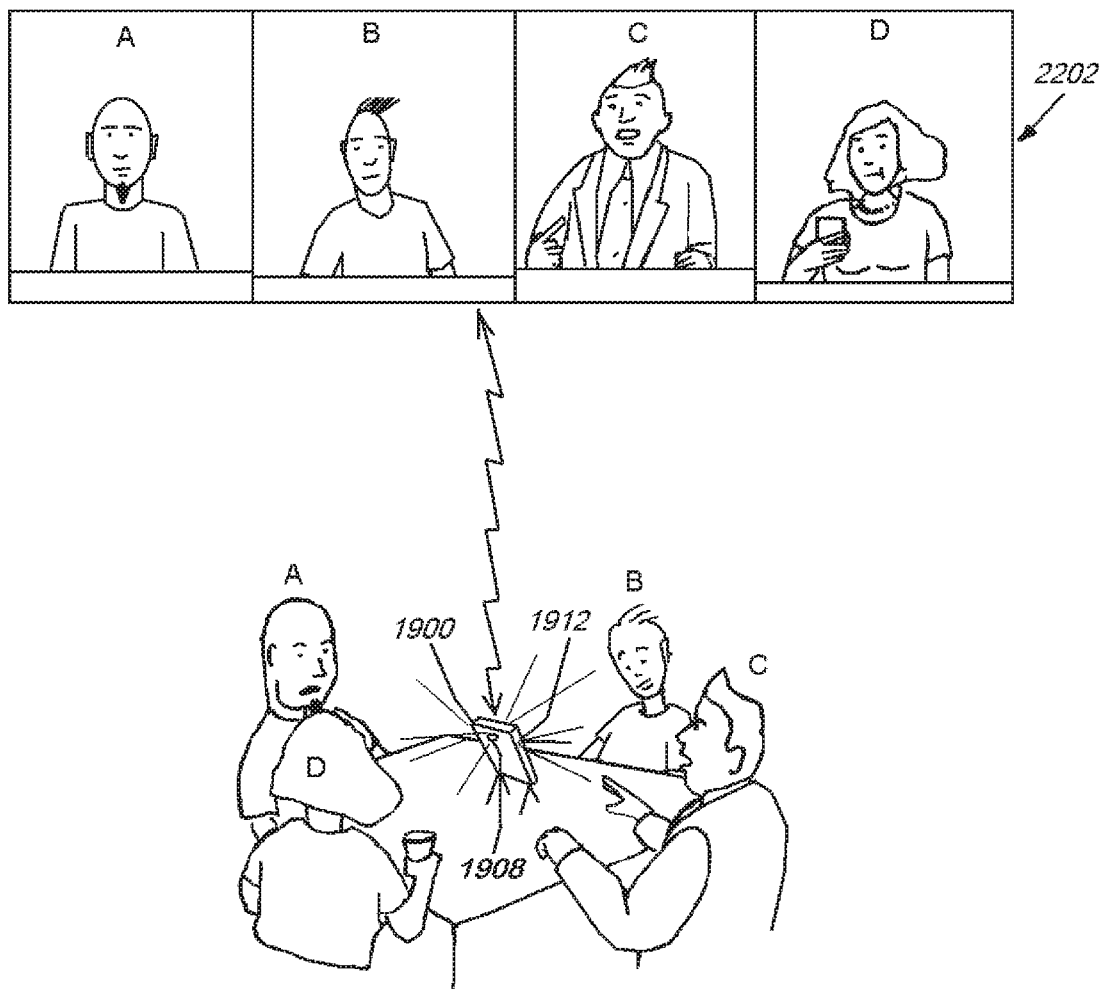
FIG. 22 is a schematic view of four people seated around a smartphone and participating in a video chat with a remote recipient, and showing participants displayed on the remote participant's smartphone in another tiled arrangement, according to an illustrative embodiment.

FIG. 22 is a schematic view of four people seated around a smartphone and participating in a video chat with a remote recipient, and showing participants displayed on the remote participant's smartphone in another tiled arrangement, according to an illustrative embodiment. The remote participant's smartphone screen can display the participants participating at the user's smartphone in a long tiled display 2202, with each participant arranged in a row. The participants can be arranged in the same order that they are arranged around the table. The remote participant can hold the remove phone sideways to allow the remote participants to be shown side-by-side at a maximum possible size. Similarly, the local user can hold the phone sideways to allow imaging of multiple remote participants to be shown in a row. While holding the phone sideways, cameras at the top and bottom of the phone can be referred to as side cameras, and can collect video image data of participants located to the sides of the phone. Video image data of participant(s) at a particular phone can also be shown on the screen for that phone.

Figure 23:
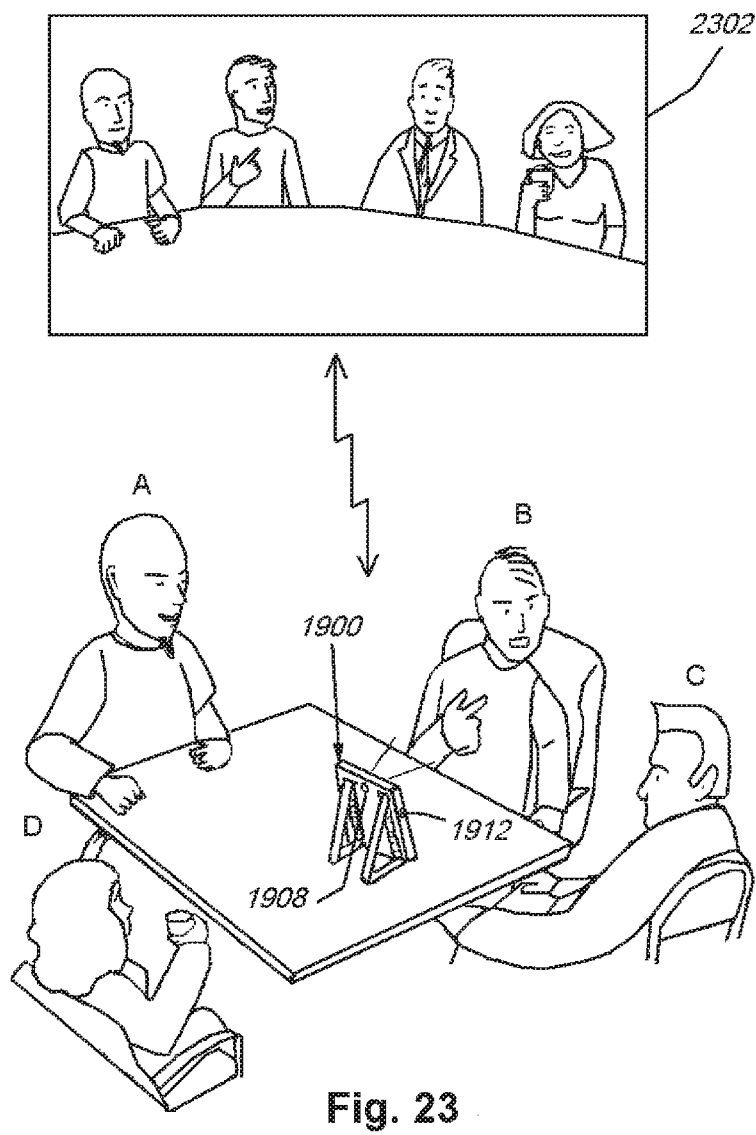
FIG. 23 is a schematic view of four people seated around a smartphone and participating in a video chat with a remote recipient, and showing participants displayed on the remote participant's smartphone in a panoramic arrangement, according to an illustrative embodiment.

FIG. 23 is a schematic view of four people seated around a smartphone and participating in a video chat with a remote recipient, and showing participants displayed on the remote participant's smartphone in a panoramic arrangement, according to an illustrative embodiment. The remote participant's smartphone screen can display the participants participating at the user's smartphone in a panoramic format, with the participants arranged as they are arranged around the user's smartphone. The chat app can combine, or stitch together, video image data from different cameras to show all participants at the user's smartphone next to each other in a panoramic view as they appear around the table. Four people seated around a table, as shown, can appear unfolded on the panoramic display 2302 as four people sitting in a row. The chat app can include a module that calibrates the location of each of the cameras relative to each other, so that the chat app can combine the images correctly into a single panoramic view. In various embodiments, the chat app can rely on the manufacturer's specifications for the locations of each camera, and/or can use the areas of overlap between cameras to calibrate the cameras relative to each other.

Figure 24:
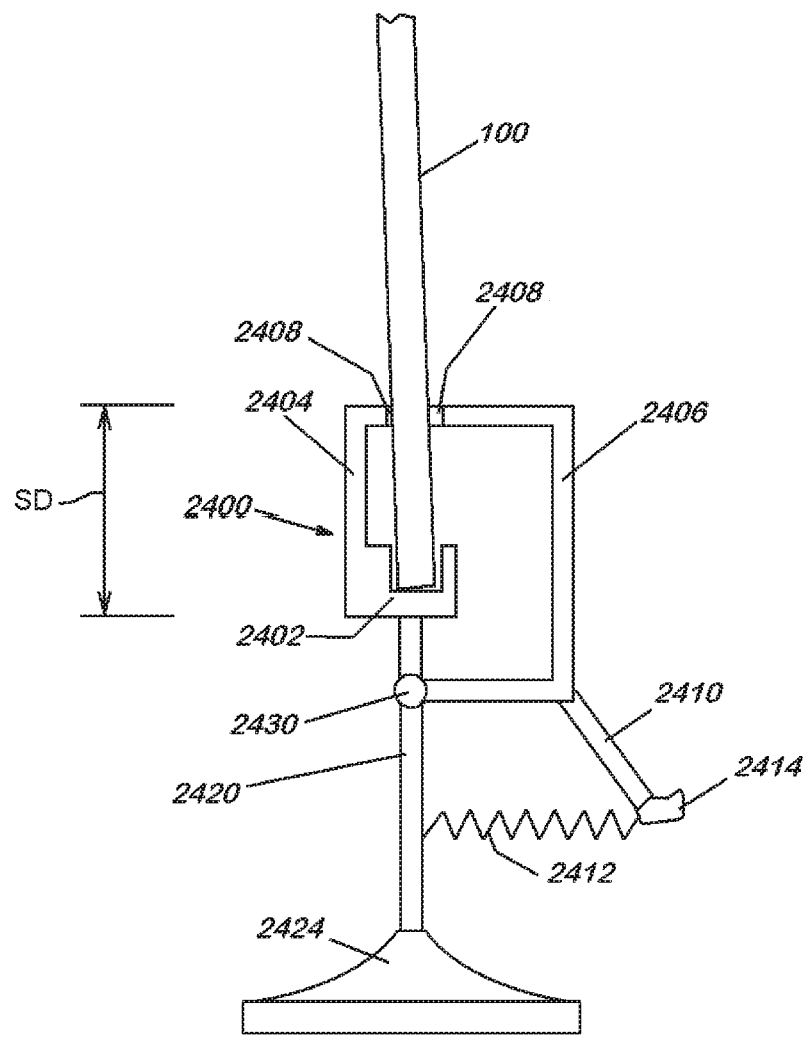
FIG. 24 is a schematic view of a stand for a smartphone, according to an illustrative embodiment.

FIG. 24 is a schematic view of a stand for a smartphone, according to an illustrative embodiment. A smartphone stand 2400 can be designed to hold a phone up in the middle of a table, in the center of a conference, in the center of a group of participants, etc. The smartphone stand 2400 can be designed to minimize the amount of the phone that is covered by the grasping mechanisms of the stand. In various embodiments, the phone can be inserted into the stand up to stand depth SD, which can be less than two inches, less than 1.5 inches, or less than 1 inch. Stand 2400 can have a cradle 2402, a first support 2404, and a second support 2406. The first and second supports 2404 and 2406 can have pads 2408 at the end of the support, so that the pad can rest against the phone. Pads 2408 can be made of a resilient material. The second support 2406 can be biased towards the smartphone 1200 by biasing member 2412, which can be a spring. The second support 2406 can have a release mechanism 2410, including a fingergrip 2414, so that a user can squeeze on the fingergrip 2414 to compress the biasing member 2412 and rotate the second support 2406 around the pivoting hinge 2430. The stand 2400 can have a stem 2420 and a base 2424. Base 2424 can be a suction cup, so the stand can be stuck to a table or other surface. In various embodiments, the base can also be a threaded member adapted to attach to a tripod, or a weighed base, or other bases that can be used to support a smartphone. In various embodiments, a stand 2400 can have multiple bases that can be interchangeable.

It should be clear that the multi-camera, multi-screen smartphone as described above, provides a versatile and user-friendly platform for acquiring video images of room full of subjects for use in conducting an immersive chat or a creating panoramic movie. The arrangement of cameras effectively employs the available real estate of the front, rear and sides of the phone, in combination with available miniaturized components, to provide the desired functionality. A variety of software applications can be developed to take full advantage of the power of such a smartphone system.

The side cameras, in conjunction with the front and rear cameras, along with screens on both sides of the device can allow families to sit in comfortable and informal settings in various locations around a room and still participate in a single video chat together as a group. Each participant can be within the field of view of at least one camera, although not all participants need to be in the field of view of the same camera, and each participant can see one of the screens, although not all participants need to see the same screen. In this way, families, groups of friends, business meeting participants, or others can participate in a video chat together without (free of) crowding around a single camera and without (free of) crowding around a single screen.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments of the apparatus and method of the present invention, what has been described herein is merely illustrative of the application of the principles of the present invention. Also, as used herein, the terms "process" and/or "processor" should be taken broadly to include a variety of electronic hardware and/or software based functions and components (and can alternatively be termed functional "modules" or "elements"). Moreover, a depicted process or processor can be combined with other processes and/or processors or divided into various sub-processes or processors. Such sub-processes and/or sub-processors can be variously combined according to embodiments herein. Likewise, it is expressly contemplated that any function, process and/or processor herein can be implemented using electronic hardware, software consisting of a non-transitory computer-readable medium of program instructions, or a combination of hardware and software. Additionally, as used herein various directional and dispositional terms such as "vertical", "horizontal", "up", "down", "bottom", "top", "side", "front", "rear", "left", "right", and the like, are used only as relative conventions and not as absolute directions/dispositions with respect to a fixed coordinate space, such as the acting direction of gravity. Additionally, where the term "substantially" or "approximately" is employed with respect to a given measurement, value or characteristic, it refers to a quantity that is within a normal operating range to achieve desired results, but that includes some variability due to inherent inaccuracy and error within the allowed tolerances of the system (e.g. 1-5 percent). For example, it is expressly contemplated that the software application (instantiated on the phone and/or a remote server) controlling the operation of the multiple cameras, and/or display of images therefrom, can allow for a plurality of smartphones to be used in combination—for example at spaced apart locations along a tabletop, with camera images from both sets of cameras appropriately displayed to a remote viewer. Such an application can, thus, include appropriate handshake protocols to link the communications of two cameras in a conference-like communication arrangement. Moreover, while this description describes handheld "smartphones" of various sizes, the same multiple-camera functionality can be implemented on slightly larger handheld devices—such as so-called tablets—for example the popular iPad from Apple—and the description should be taken broadly to include such devices and the common ranges of dimensions in which such devices are manufactured. Accordingly, this description is meant to be taken only by way of example, and not to otherwise limit the scope of this invention.

What is claimed is:

1. A smartphone comprising:
    a housing having a front face, a rear face, a left side edge and a right side edge, the left side edge and the right side edge separating the front face and the rear face;
    a front display screen on the front face;
    a rear display screen on the rear face;
    at least one front camera on the front face;
    at least one rear camera on the rear face;
    at least one left camera on the left side edge;
    at least one right camera on the right side edge; and
    a processor in the housing that arranges image data streams from each of the front camera, the rear camera, the left camera and the right camera for storage or data transmission to a recipient device over a wireless network, wherein the processor operates at least one of a video imaging application and a video chat application that coordinates acquisition of subject images by the front camera, the rear camera, the left camera, and the right camera and that displays images of one or more subjects from the recipient device on at least one of the front display screen and the rear display screen, wherein the processor presents up to four subjects from the recipient device in up to four tiles on the front screen and on the back screen, with up to four videos of users at the user's phone shown in smaller tiles.

2. The smartphone as set forth in claim 1, further comprising at least one camera on the top edge, and at least one camera on the bottom edge.

3. The smartphone as set forth in claim 1, further comprising two or more microphones on different edges and/or faces of the smartphone for use in triangulating the source of a sound.

4. The smartphone as set forth in claim 1, wherein at least one side camera is mounted within a notch on the side of the smartphone.

5. The smartphone as set forth in claim 4, wherein the notch is covered with a clear covering, so that the side of the smartphone has a smooth, unbroken appearance at the notch.

6. The smartphone as set forth in claim 5, wherein the clear covering is a prismatic lens that allows the at least one side camera to image more than 180 degrees around the smartphone.

7. The smartphone as set forth in claim 1, wherein at least one side camera is under a covering that bulges out from the side of the smartphone.

8. The smartphone as set forth in claim 7, wherein the covering is a prismatic lens that allows the at last one side camera to image more than 180 degrees around the smartphone.

9. A method of participating in a video chat comprising:
positioning multiple participants around a user's smartphone, the smart phone having a front camera, a rear camera, a left side camera, and a right side camera, the participants positioned so that different participants can be imaged by different cameras, at least one of the cameras being a left side camera or a right side camera;
capturing video of the multiple participants using the different cameras;
transmitting the video taken from multiple cameras and showing the multiple participants to a remote device;
receiving video from the remote device at the user's smartphone; and
displaying the video received from the remote device on the user's smartphone, the user's smartphone having a screen on the front of the smartphone and a screen on the back of the smartphone, wherein displaying the video includes displaying the same video on the front screen and on the back screen, wherein displaying the video includes displaying video of multiple participants collected from multiple cameras at the remote participant's smartphone, and wherein displaying the video includes presenting up to four remote participant videos in up to four tiles on the front screen and on the back screen, with up to four videos of users at the user's phone shown in smaller tiles.

10. The method of claim 9, further comprising, triangulating a source of a sound, using multiple microphones, to identify which participant is speaking.

11. A handheld communication device comprising:
a housing having a front face, a rear face, a left side edge, a top side edge, a right side edge, and a bottom side edge, the left side edge, the top side edge, the right side edge, and the bottom side edge separating the front face and the rear face;
a front display screen on the front face;
at least one front camera on the front face;
at least one rear camera on the rear face;
at least two edge cameras arranged on at least two of the left side edge, top side edge, right side edge, and bottom side edge; and
a processor in the housing that arranges at least one image data stream from at least one of the front camera, the rear camera, a first edge camera of the at least two edge cameras, and a second edge camera of the at least two edge cameras, for storage or data transmission to a recipient device over a wireless network, wherein the processor operates at least one of a video imaging application and a video chat application that coordinates acquisition of subject images by at least one of the front camera, the rear camera, a first edge camera of the at least two edge cameras, and a second edge camera of the at least two edge cameras, and that displays images of one or more subjects from the recipient device on the front display screen, wherein the processor presents up to four subjects from the recipient device in up to four tiles on the front screen, with up to four videos of users at the user's phone shown in smaller tiles.

12. The handheld communication device as set forth in claim 11 further comprising a rear display on the rear face.

13. The handheld communication device as set forth in claim 11, wherein the at least two edge cameras include a left camera on the left side, a top camera on the top side, a right camera on the right side, and a bottom camera on the bottom side.

14. The handheld communication device as set forth in claim 11, further comprising two or more microphones on different edges and/or faces of the handheld communication device for use in triangulating a source of a sound.

15. The handheld communication device as set forth in claim 11, wherein at least one of the first edge camera of the at least two edge cameras, and the second edge camera of the at least two edge cameras are mounted within at least one notch on at least one edge of the handheld communication device.

16. The handheld communication device as set forth in claim 15, wherein the at least one notch is covered with a clear covering, so that the at least one edge of the handheld communication device with the at least one notch has a smooth, unbroken appearance at the at least one notch.

17. The handheld communication device as set forth in claim 16, wherein the clear covering is a prismatic lens that allows the at least one of the first edge camera of the at least two edge cameras, and the second edge camera of the at least two edge cameras mounted within the at least one notch to image more than 180 degrees around the handheld communication device.

18. The handheld communication device as set forth in claim 11, wherein at least one of the first edge camera of the at least two edge cameras, and the second edge camera of the at least two edge cameras is under at least one covering that bulges out from at least one edge of the handheld communication device, and wherein the at least one covering is a prismatic lens that allows the at least one camera under the covering that bulges out to image more than 180 degrees around the handheld communication device.

19. A method of participating in a video chat comprising:
positioning multiple participants around a user's handheld communication device, the smart phone having a front camera, a rear camera, and at least two edge cameras arranged on at least two of the left side edge, top side edge, right side edge, and bottom side edge the participants positioned so that different participants can be imaged by different cameras, at least one of the cameras being at least one of the at least two edge cameras;
capturing video of the multiple participants using the different cameras;
transmitting the video taken from multiple cameras and showing the multiple participants to a remote device;
receiving video from the remote device at the user's handheld communication device; and
displaying the video received from the remote device on a screen on the front of the user's handheld communication device, wherein displaying the video includes displaying video of multiple participants collected from multiple cameras at the remote participant's handheld communication device, and wherein displaying the video includes presenting up to four remote participant videos in up to four tiles on the screen on the front of the user's handheld communication device, with up to four videos of users at the user's phone shown in smaller tiles.

20. The method of claim 19, further comprising, triangulating a source of a sound, using multiple microphones, to identify which participant is speaking.

* * * * *